US012755639B2

(12) United States Patent
Yamashita et al.

(10) Patent No.: US 12,755,639 B2
(45) Date of Patent: Oct. 6, 2026

(54) FLYING BODY IDENTIFICATION SYSTEM, CONTROL SYSTEM, FLYING BODY IDENTIFICATION METHOD, COMPUTER READABLE MEDIUM, AND FLYING BODY

(71) Applicant: NEC Corporation, Tokyo (JP)

(72) Inventors: Toshiaki Yamashita, Tokyo (JP); Hideo Adachi, Tokyo (JP); Hisashi Mizumoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 285 days.

(21) Appl. No.: 18/273,702

(22) PCT Filed: Jan. 29, 2021

(86) PCT No.: PCT/JP2021/003127
§ 371 (c)(1),
(2) Date: Jul. 21, 2023

(87) PCT Pub. No.: WO2022/162849
PCT Pub. Date: Aug. 4, 2022

(65) Prior Publication Data

US 2024/0105066 A1 Mar. 28, 2024

(51) Int. Cl.
*G08G 5/55* (2025.01)
*G08G 5/26* (2025.01)
*G08G 5/58* (2025.01)

(52) U.S. Cl.
CPC ................. *G08G 5/55* (2025.01); *G08G 5/26* (2025.01); *G08G 5/58* (2025.01)

(58) Field of Classification Search
CPC .. G08G 5/55; G08G 5/26; G08G 5/58; G08G 5/57; G08G 5/76; G08G 5/32; G08G 5/53; G08G 5/727
See application file for complete search history.

(56) References Cited

U.S. PATENT DOCUMENTS 8,078,162 B2 * 12/2011 Deaton ................ H04Q 3/0079 455/431
9,412,278 B1 * 8/2016 Gong ....................... G08G 5/26
(Continued)

FOREIGN PATENT DOCUMENTS

CN 105739520 A 7/2016
EP 3633653 A1 4/2020
(Continued)

OTHER PUBLICATIONS

International Search Report for PCT Application No. PCT/JP2021/003127, mailed on Apr. 20, 2021.
(Continued)

*Primary Examiner* — Anne Marie Antonucci
*Assistant Examiner* — Luis G Del Valle
(74) *Attorney, Agent, or Firm* — Sughrue Mion, PLLC

(57) ABSTRACT

A flying body identification system according to the present example embodiment includes: a flying body; a communication terminal configured to obtain an airframe ID of the flying body; and a control system configured to control an operation of the flying body. The control system is also configured to: manage the airframe ID and a plurality of pieces of information regarding the flying body indicated by the airframe ID so as to be associated with each other; select, in a case where an inquiry message containing the airframe ID and an authority level assigned to the communication terminal is received from the communication terminal, information to be transmitted to the communication terminal among the plurality of pieces of information regarding the flying body associated with the airframe ID in accordance with the authority level of the communication terminal; and transmit the selected information to the communication terminal.

17 Claims, 16 Drawing Sheets

(56) References Cited

U.S. PATENT DOCUMENTS

| | | | |
|---|---|---|---|
| 2012/0311340 A1 | 12/2012 | Naganuma et al. | |
| 2014/0297110 A1 | 10/2014 | Noda et al. | |
| 2016/0212601 A1 | 7/2016 | Braun et al. | |
| 2017/0372617 A1 | 12/2017 | Bruno et al. | |
| 2018/0222582 A1* | 8/2018 | Ohata | G08G 5/723 |
| 2019/0027050 A1* | 1/2019 | Soma | G05D 1/0676 |
| 2019/0278897 A1* | 9/2019 | Zhang | G08G 5/55 |
| 2020/0198782 A1 | 6/2020 | Li et al. | |
| 2021/0197762 A1 | 7/2021 | Abiakle Kai et al. | |
| 2021/0331813 A1* | 10/2021 | Yi | G05D 1/0022 |
| 2022/0041187 A1* | 2/2022 | Chakraborty | B60W 60/0025 |
| 2022/0208009 A1* | 6/2022 | Yamazaki | G08G 5/56 |

FOREIGN PATENT DOCUMENTS

| | | |
|---|---|---|
| JP | 2014-082790 A | 5/2014 |
| JP | 2014-195143 A | 10/2014 |
| JP | 2017-151839 A | 8/2017 |
| JP | 2019-530067 A | 10/2019 |
| JP | 2020-164161 A | 10/2020 |
| JP | 2020-537266 A | 12/2020 |
| KR | 2018-0099977 A | 9/2018 |
| KR | 20190110499 A | 9/2019 |
| WO | 2015/043813 A1 | 4/2015 |
| WO | 2017/145398 A1 | 8/2017 |
| WO | 2019/042262 A1 | 3/2019 |
| WO | 2020/060573 A1 | 3/2020 |

OTHER PUBLICATIONS

Extended European Search Report for EP Application No. 21922865.7, dated on Feb. 27, 2024.

CN Office Action for CN Application No. 202180092199.3, mailed on Sep. 30, 2025 with English Translation.

European Office Action for EP Application No. 21922865.7, mailed on Jul. 27, 2026.

* cited by examiner

| AFTER START OF FLIGHT | AIRFRAME ID |
|---|---|
| 0 MINUTES | #0 |
| 10 MINUTES | #1 |
| 20 MINUTES | #2 |
| 30 MINUTES | #3 |

Fig. 2

| AUTHORITY LEVEL | INFORMATION ON FLYING BODY |
| --- | --- |
| 3 | PERSONAL INFORMATION OF USER |
| 2 | FLIGHT PATH AND REMAINING BATTERY LIFE |
| 1 | DESTINATION |

Fig. 12

FLYING BODY IDENTIFICATION SYSTEM, CONTROL SYSTEM, FLYING BODY IDENTIFICATION METHOD, COMPUTER READABLE MEDIUM, AND FLYING BODY

This application is a National Stage Entry of PCT/JP2021/003127 filed on Jan. 29, 2021, the contents of all of which are incorporated herein by reference, in their entirety.

TECHNICAL FIELD

The present disclosure relates to a flying body identification system, a control system, a flying body identification method, a computer readable medium, and a flying body.

BACKGROUND ART

In recent years, research and development of flying bodies such as flying cars have become active. For example, Patent Literature 1 discloses a flying vehicle operation system in which operations of a flying vehicle from takeoff in a first takeoff/landing section to landing in a second takeoff/landing section are automatically executed under controls of a control system configured to control operations of the flying vehicle.

CITATION LIST

Patent Literature

Patent Literature 1: Japanese Unexamined Patent Application Publication No. 2017-151839

SUMMARY OF INVENTION

Technical Problem

In order for flying bodies to become transportation means, it is required a mechanism to increase a feeling of security with respect to the flying bodies and make the flying bodies accepted by society. In order to increase the feeling of security with respect to the flying bodies, it is conceivable to allow anyone to obtain information on flying bodies during flight. On the other hand, the information on the flying bodies contains various kinds of information such as airframe IDs, remaining energy lives, and flight paths. It is a security problem to disclose all kinds of the information, and it is necessary to provide appropriate information on flying bodies depending on the situation.

It is an object of the present disclosure to solve such problems and provide a flying body identification system, a control system, a flying body identification method, a computer readable medium, and a flying body capable of appropriately providing information on flying bodies depending on the situation while improving security thereof.

Solution to Problem

A flying body identification system according to the present disclosure includes:

a flying body;

a communication terminal configured to obtain an airframe ID of the flying body; and a control system configured to control an operation of the flying body, wherein the control system is also configured to:

manage the airframe ID and a plurality of pieces of information regarding the flying body indicated by the airframe ID so as to be associated with each other;

select, in a case where an inquiry message containing the airframe ID and an authority level assigned to the communication terminal is received from the communication terminal, information to be transmitted to the communication terminal from among the plurality of pieces of information regarding the flying body associated with the airframe ID in accordance with the authority level of the communication terminal; and transmit the selected information to the communication terminal.

A control system according to the present disclosure includes:

a communication unit configured to communicate with a communication terminal;

a storage unit configured to manage and store an airframe ID of a flying body and a plurality of pieces of information regarding the flying body indicated by the airframe ID so as to be associated with each other; and a selection unit configured to select information to be transmitted to the communication terminal from among the plurality of pieces of information regarding the flying body, wherein in a case where the communication unit receives, from the communication terminal, an inquiry message containing the airframe ID and an authority level assigned to the communication terminal, the selection unit is further configured to refer to the storage unit to select, in accordance with the authority level of the communication terminal, the information to be transmitted to the communication terminal from among the plurality of pieces of information regarding the flying body associated with the airframe ID, and the communication unit is further configured to transmit the information selected by the selection unit to the communication terminal.

A flying body identification method according to the present disclosure is a method including:

managing an airframe ID of a flying body and a plurality of pieces of information regarding the flying body indicated by the airframe ID so as to be associated with each other;

selecting, in a case where an inquiry message containing the airframe ID and an authority level assigned to a communication terminal is received from the communication terminal, information to be transmitted to the communication terminal from among the plurality of pieces of information regarding the flying body associated with the airframe ID in accordance with the authority level of the communication terminal; and transmitting the selected information to the communication terminal.

A computer readable medium according to the present disclosure is a non-transitory computer readable medium in which a program is stored, the program causing a computer to execute processes to:

manage the airframe ID and a plurality of pieces of information regarding the flying body indicated by the airframe ID so as to be associated with each other;

select, in a case where an inquiry message containing the airframe ID and an authority level assigned to the communication terminal is received from the communication terminal, information to be transmitted to the communication terminal from among the plurality of pieces of information regarding the flying body associated with the airframe ID in accordance with the authority level of the communication terminal; and transmit the selected information to the communication terminal.

A flying body according to the present disclosure is a flying body comprising:

a storage unit configured to store flying body information and an authority level so as to be associated with each other, the flying body information being information regarding a flying body;

an encryption unit configured to encrypt the flying body information associated with a predetermined authority level; and a communication unit configured to send the encrypted flying body information.

Advantageous Effects of Invention

According to the present disclosure, there can be provided a flying body identification system, a control system, a flying body identification method, a computer readable medium, and a flying body capable of appropriately providing information on a flying body depending on the situation while improving security thereof.

BRIEF DESCRIPTION OF DRAWINGS

FIG. 2 is a view illustrating an example of an airframe ID table according to the first example embodiment.

FIG. 12 is a view illustrating correspondence between an authority level and information on the flying body according to the fourth example embodiment.

EXAMPLE EMBODIMENTS

Hereinafter, specific example embodiments to which the present invention is applied will be described in detail with reference to the drawings. However, the present invention is not limited to the following example embodiments. Further, for the sake of clarification of the descriptions, the following description and the drawings will be simplified as appropriate.

First Example Embodiment

Figure 1:
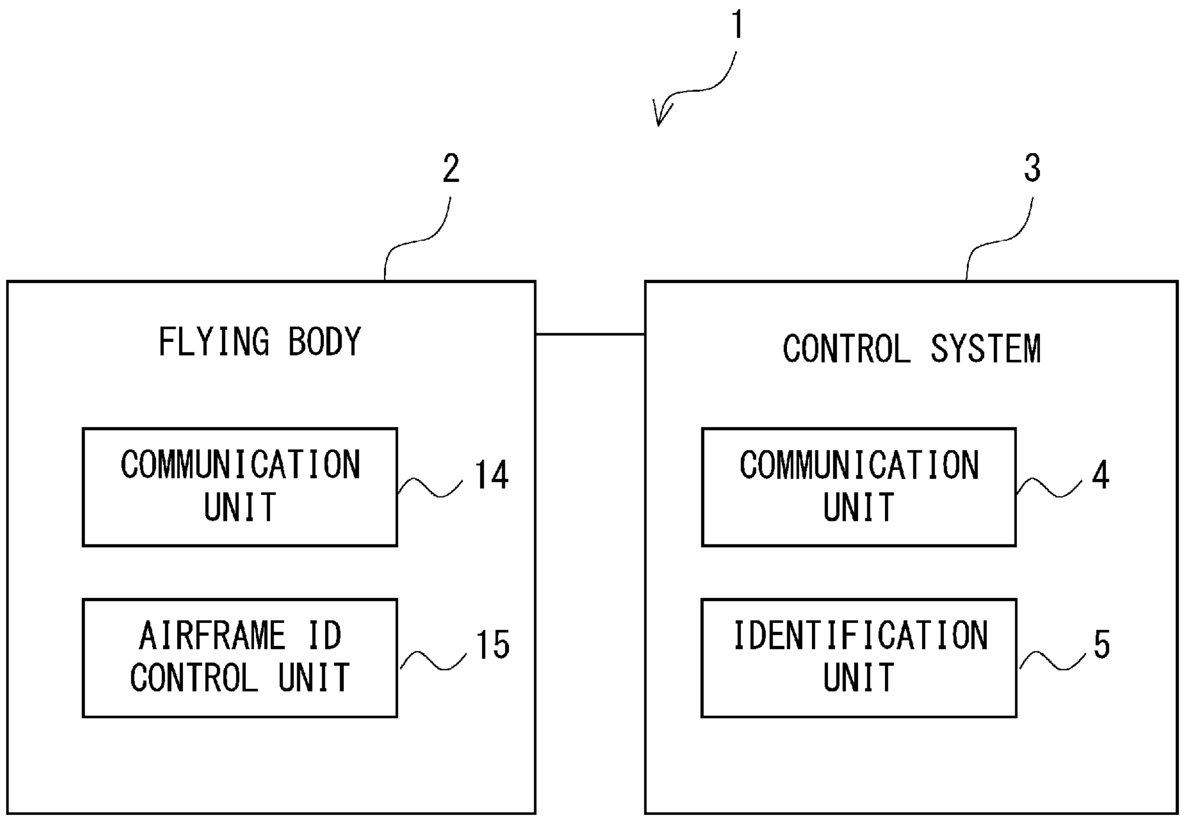
FIG. 1 is a block diagram illustrating a configuration of a flying body identification system according to a first example embodiment.

FIG. 1 is a block diagram illustrating a configuration of a flying body identification system 1 according to a first example embodiment. The flying body identification system 1 includes a flying body 2 and a control system 3.

The flying body 2 is, for example, a rotorcraft having rotor wings such as a drone, an unmanned aerial vehicle (UAV), a flying car, or a vertical take-off and landing aircraft (VTOL). The flying body 2 generates lifting power and thrust by rotationally driving the rotor wings. The flying body 2 may be an unmanned aircraft on which luggage or the like is loaded, or may be a manned aircraft on which passengers board.

The flying body 2 has an airframe ID as its own airframe identification information. Different airframe IDs are respectively assigned to different flying bodies 2, and no flying body 2 having the same airframe ID exists. The flying body 2 has a communication unit 14 and an airframe ID control unit 15. Each of the communication unit 14 and the airframe ID control unit 15 may be software or modules on which processes are executed by a processor executing programs stored in a memory. Alternatively, the communication unit 14 and the airframe ID control unit 15 may be hardware such as circuits or chips.

The communication unit 14 is configured to send the airframe ID. The communication unit 14 is configured to execute wireless communication with the ground side, that is, the control system 3. The communication unit 14 executes the wireless communication with the control system 3 in accordance with frequency, transmission power, and the like, which are determined in advance with the control system 3. For example, the communication unit 14 may execute processing in accordance with communication standards, such as 5G or 4G, defined in 3GPP (3rd Generation Partnership Project), or may execute processing in accordance with communication standards such as Wi-Fi (registered trademark) or Bluetooth (registered trademark). The communication unit 14 is configured to transmit wireless signals to the control system 3. The communication unit 14 is also configured to receive wireless signals from the control system 3. This makes it possible to transmit and receive data and information between the flying body 2 and the control system 3. The communication unit 14 is configured to transmit the airframe ID and positional information of the flying body 2 to the control system 3.

Further, the communication unit 14 can send the airframe ID not only to the control system 3, but also to a communication terminal such as a smartphone, for example. In this case, by installing a predetermined application in the smartphone, for example, it is possible to obtain the airframe ID sent by the flying body 2. Further, the communication unit

14 can also transmit its own airframe ID to any of the other flying bodies 2 or receive an airframe ID from another flying body 2, thereby being capable of transmitting and receiving airframe IDs to and from any of the other flying bodies 2.

The airframe ID control unit 15 is configured to control change and sending of the airframe ID. The airframe ID control unit 15 is also configured to hold its own airframe ID that is changed in accordance with a predetermined change pattern. For example, the airframe ID may be changed every predetermined time, or may be changed at arbitrary timing. The timing of changing the airframe ID can be set to timing desired by a user or the like. For example, the airframe ID may be changed when the number of flights increases, or may be changed after multiple flights.

For example, as illustrated in an airframe ID table of FIG. 2, the airframe ID control unit 15 may create a plurality of airframe IDs as the predetermined change pattern in advance, and change the airframe IDs every predetermined time. The communication unit 14 may transmit the airframe ID table stored by the airframe ID control unit 15 to the control system 3. This allows the airframe ID control unit 15 to share the change pattern of the airframe IDs with the control system 3 configured to control its own flight. Alternatively, the communication unit 14 may receive the airframe ID table from the control system 3. These cause the flying body 2 and the control system 3 to share the change pattern of the airframe IDs of the flying body 2.

In the airframe ID table illustrated in FIG. 2, an airframe ID at the start of flight (after 0 minutes from the start of flight) is set to #0; an airframe ID after 10 minutes from the start of flight is set to #1; an airframe ID after 20 minutes from the start of flight is set to #2; and an airframe ID after 30 minutes from the start of flight is set to #3. Note that the airframe ID table illustrated in FIG. 2 is illustrative and arbitrary airframe IDs may be generated. For example, the airframe ID control unit 15 or the control system 3 may generate airframe IDs by using algorithm, a random number generating function. Further, the airframe ID may be a randomly generated ID or an ID to be changed in accordance with at least one of the number of flights or a flight time of its own airframe.

The flying body 2 flies in accordance with a flight plan defined in advance while performing wireless communication with the control system 3. The flying body 2 can autonomously fly along a flight path from a takeoff place to a landing place. For example, the flying body 2 takes off from a takeoff/landing facility and flies along the flight path based on the flight plan. When the flying body 2 flies to the landing place corresponding to a destination, the flying body 2 lands at the landing place. The flight path is a three-dimensional path from the takeoff place to the landing place. Takeoff/landing facilities designated in advance can be used for the takeoff place and the landing place. Note that each of the takeoff place and the landing place may be an arbitrary place as long as there is a space where the flying body 2 can land. Of course, a takeoff/landing place for takeoff and a takeoff/landing place for landing can be the same place.

Piloting of the flying body 2 can be switched between automatic pilot and manual pilot by a pilot. For example, the flying body 2 can be configured so as to set automatic pilot and switch from the automatic pilot to manual pilot in an emergency because the pilot is required to have advanced maneuvering skills in an area with many obstacles, such as an urban area.

The control system 3 is a system for managing and controlling operations. The control system 3 is a hardware device (or a computer device) for executing operation management and air traffic control for the flying body 2, and is installed in an operating control center. The control system 3 is not limited to a single physical device. For example, a plurality of processors may work together to execute processing described later.

Further, in order to execute wide area controls, the control system 3 may be provided at an air traffic control center configured to communicate with a plurality of operating control centers. Thus, the control system 3 in the operating control center and the control system 3 at the air traffic control center communicate with each other, whereby, it is possible to control the flying body 2 over a wide area.

The control system 3 has a communication unit 4 and an identification unit 5. Each of the communication unit 4 and the identification unit 5 may be software or modules on which processes are executed by a processor executing programs stored in a memory. Alternatively, the communication unit 4 and the identification unit 5 may be hardware such as circuits or chips.

The communication unit 4 obtains an airframe ID and positional information of the flying body 2 sent from the flying body 2. Further, the communication unit 4 also obtains the airframe ID and the positional information of the flying body 2 at different timing.

The identification unit 5 identifies the flying body 2 using the airframe ID received from the flying body 2. For example, the identification unit 5 may be configured to hold in advance a table in which airframe IDs and flying bodies are associated with each other, and refer to the table to extract a flying body associated with the received airframe ID.

Here, the communication unit 4 may obtain a different airframe ID from a flying body 2 at different timing. In this case, the identification unit 5 determines whether the airframe ID different from a first airframe ID indicates the flying body 2 associated with the first airframe ID or not on the basis of a change between positional information obtained together with the first airframe ID and positional information obtained together with the airframe ID different from the first airframe ID. For example, the change in the positional information may be indicated by using a distance or the like between the positional information obtained at the different timings. For example, the identification unit 5 may determine that the airframe ID different from the first airframe ID indicates the flying body 2 associated with the first airframe ID when the change in the positional information is within a predetermined range.

Figure 3:
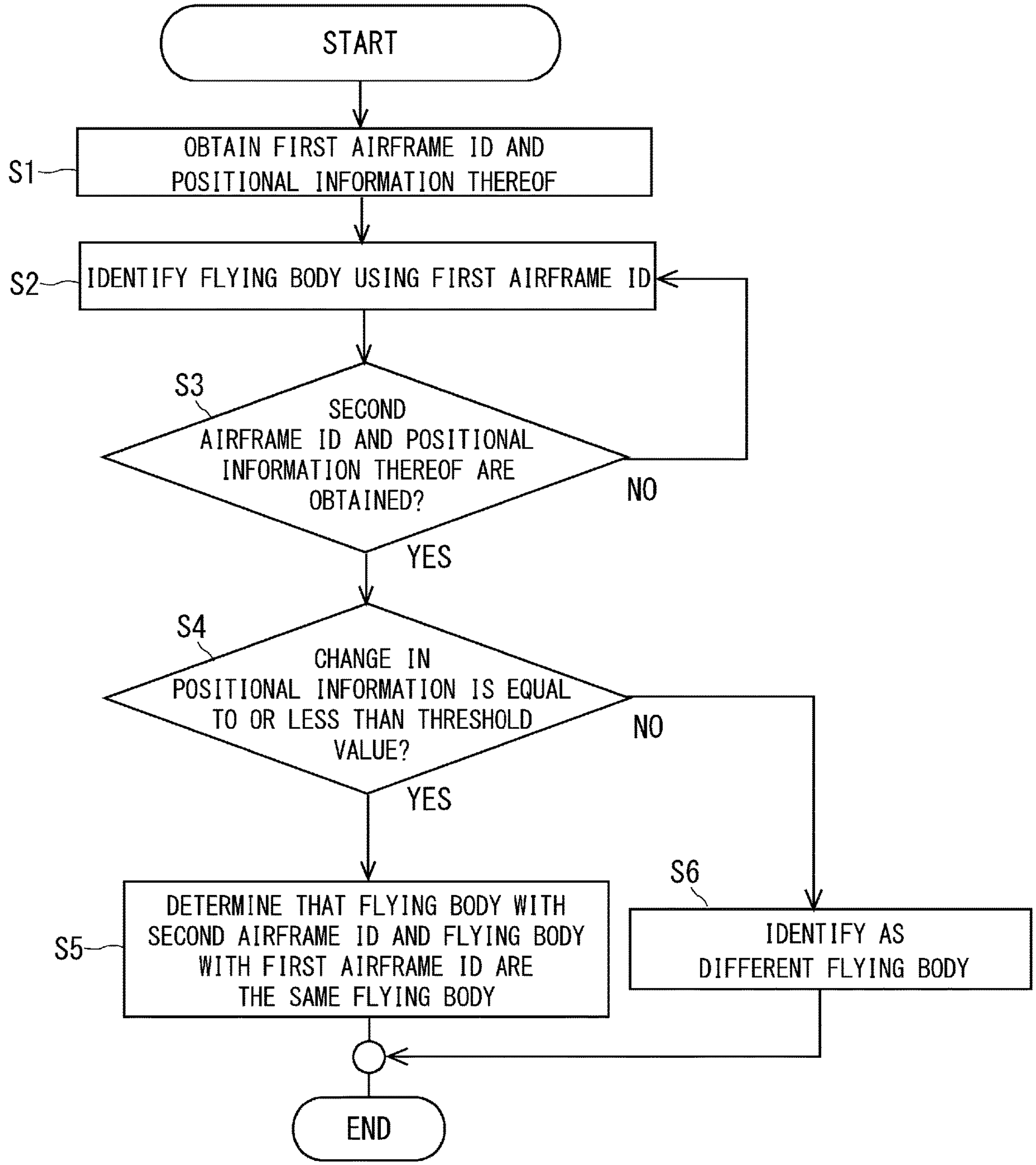
FIG. 3 is a flowchart illustrating an operation of a control system according to the first example embodiment.

Hereinafter, an operation of the control system 3 according to the first example embodiment will be described with reference to FIG. 3. FIG. 3 is a flowchart illustrating an operation of the control system 3 according to the first example embodiment.

First, the communication unit 4 obtains a first airframe ID and positional information of a flying body 2 (S1). Here, in order to distinguish airframe IDs, the first airframe ID described above is called a first airframe ID, and an airframe ID after change is called a second airframe ID. Next, the identification unit 5 identifies the flying body 2 using the first airframe ID (S2). After that, the control system 3 communicates with the flying body 2 that sends the first airframe ID, and executes operation management and air traffic control for the flying body 2.

Then, when the communication unit 4 does not obtain a second airframe ID and positional information of the flying body 2 that sends the second airframe ID (S3, NO), the control system 3 continues the operation management and the air traffic control for the flying body 2 that sends the first airframe ID identified by the identification unit 5.

On the other hand, the communication unit 4 obtains the second airframe ID and the positional information of the flying body 2 that sends the second airframe ID (S3, YES), the identification unit 5 determines whether the flying body 2 that sends the second airframe ID is the same as the flying body 2 that sends the first airframe ID or not on the basis of a change between the positional information when the first airframe ID is obtained and the positional information when the second airframe ID is obtained. For example, the identification unit 5 determines whether the change between the positional information when the first airframe ID is obtained and the positional information when the second airframe ID is obtained is equal to or less than a threshold value or not (S4). When it is determined that a distance between positional information obtained at different timings is equal to or less than a threshold value (for example, 50 m) set in advance (S4, YES), the identification unit 5 determines that the flying body 2 that sends the second airframe ID and the flying body 2 that sends the first airframe ID are the same flying body 2 (S5).

When it is determined that the distance between positional information obtained at the different timings is larger than the threshold value set in advance (S4, NO), the identification unit 5 identifies the flying body 2 that sends the second airframe ID as a flying body 2 different from the flying body 2 that sends the first airframe ID (S6). The control system 3 identifies the flying body 2 that sends the first airframe ID and the flying body 2 that sends the second airframe ID as different flying bodies 2, and executes the operation management and the air traffic control.

As explained above, the flying body 2 according to the first example embodiment can improve security thereof by changing airframe IDs. On the other hand, there was a problem that if the flying body 2 arbitrarily changes the airframe ID thereof, the control system 3 cannot identify the flying body 2, thereby losing the safety of flights. In contrast, the control system 3 according to the first example embodiment can specify the flying body 2 by using the positional information of the flying body 2 even in a case where different airframe IDs are obtained at different timings. As a result, the control system 3 can identify or specify a flying body 2 that changes an airframe ID thereof to be sent in consideration of the security.

Second Example Embodiment

Figure 4:
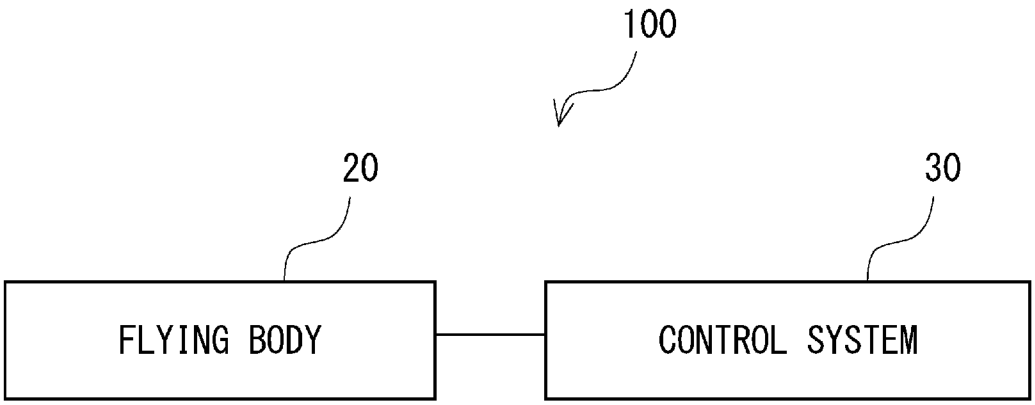
FIG. 4 is a block diagram illustrating a configuration of a flying body identification system according to a second example embodiment.

FIG. 4 is a block diagram illustrating a configuration of a flying body identification system 100 according to a second example embodiment. The flying body identification system 100 includes a flying body 20 and a control system 30.

Figure 5:
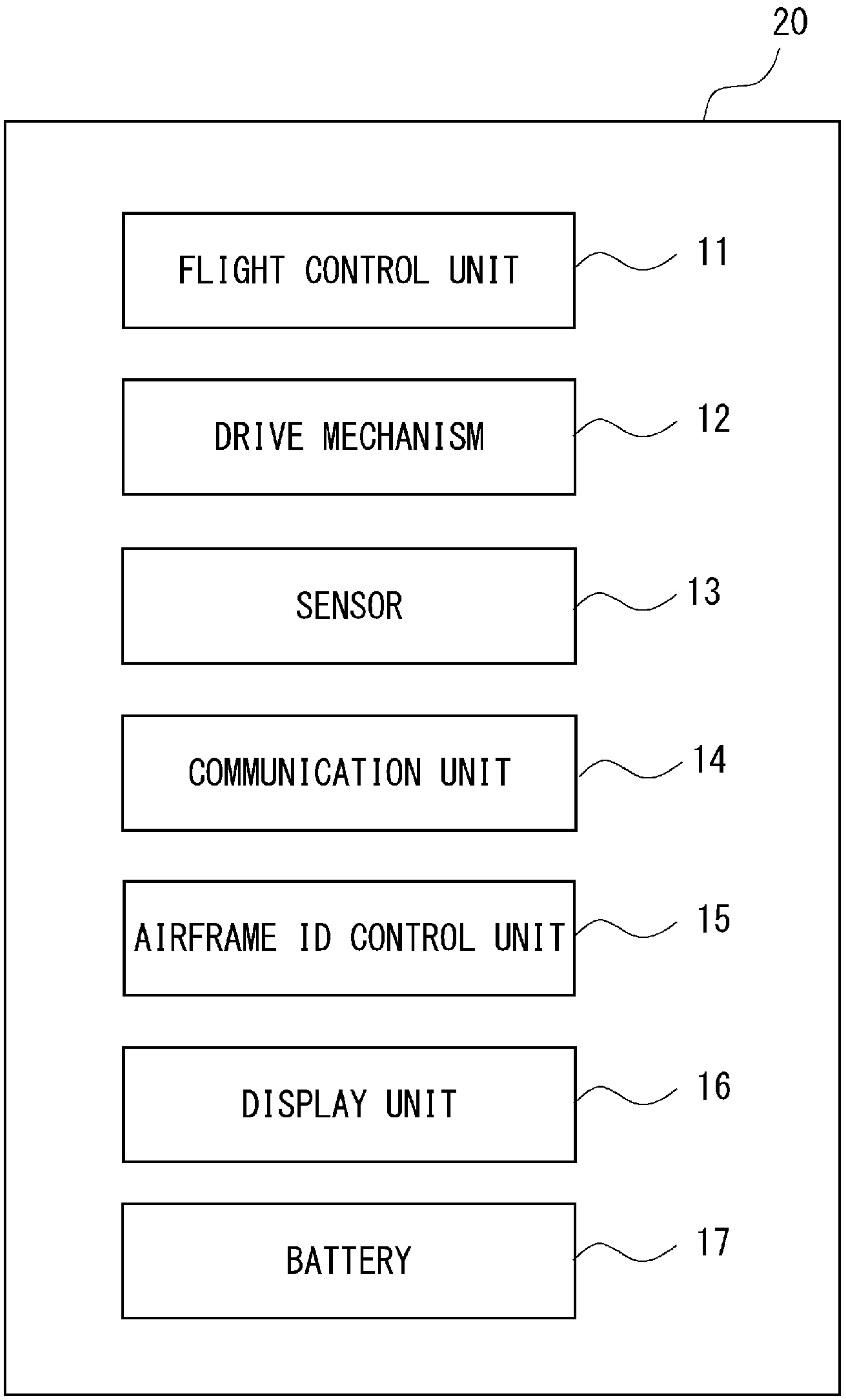
FIG. 5 is a block diagram illustrating a configuration of a flying body according to the second example embodiment.

FIG. 5 is a block diagram illustrating a configuration of the flying body 20 according to the second example embodiment. The flying body 20 includes a flight control unit 11, a drive mechanism 12, a sensor 13, a communication unit 14, an airframe ID control unit 15, a display unit 16, and a battery 17. In the flying body 20 according to the second example embodiment, similar reference numerals are respectively assigned to similar components according to the first example embodiment, and detailed explanation thereof will be omitted as appropriate.

The flight control unit 11 is configured to control each component that configures a flying body 20. The drive mechanism 12 includes a rotor wing and a motor thereof, and is configured to generate lifting power and thrust for flying. The flight control unit 11 is configured to output a driving signal for controlling the drive mechanism 12. For example, in a case where the flying body 20 has a plurality of rotor wings, the flight control unit 11 is configured to control the drive mechanism 12 to independently drive the rotor wings.

The flight control unit 11 stores a flight plan in a memory or the like. The flight control unit 11 may store a flight plan received from the control system 30 in the memory, or may store a flight plan inputted from a user of the flying body 20 in the memory. In case of automatic pilot, the flight control unit 11 is configured to control the drive mechanism 12 so as to fly along the flight plan. In a case where a position of the flying body 20 separates from a flight path thereof due to wind or the like, the flight control unit 11 is configured to control the drive mechanism 12 so that the flying body 20 flies and approaches the flight path. The flight control unit 11 can detect the position of the flying body 20 by using the sensor 13. The flight control unit 11 is configured to control the drive mechanism 12 on the basis of a detection result by the sensor 13.

The sensor 13 detects information regarding a flight state of the flying body 20. The sensor 13 has a gyro sensor for detecting attitude of an airframe, and a positional sensor for detecting a position of the airframe, for example. As the positional sensor, a satellite positioning sensor such as GPS (Global Positioning System) can be used, for example. The flight control unit 11 is configured to specify its own position on the basis of the information obtained by the sensor 13. Specifically, the flight control unit 11 specifies a three-dimensional position of the flying body 20 on the basis of positioning information received from a plurality of satellites by the sensor 13, for example. The communication unit 14 sends an airframe ID and positional information regarding the position specified by the flight control unit 11. Note that the number of the sensor 13 is not limited to one, but there may be provided a plurality of sensors 13.

The flying body 20 may be provided with the display unit 16 for showing passengers a flight status, a congestion status during flight, airframe information, and the like. The display content to be displayed on the display unit 16 may be changed in accordance with information regarding the flying body 20. For example, the display content displayed on the display unit 16 may be changed in accordance with information as to whether the flying body 20 is a manned aircraft or an unmanned aircraft. Alternatively, the display content displayed on the display unit 16 may be changed in accordance with information as to whether the flying body 20 is in automatic operation or manual operation. Note that the display unit 16 may be omitted in case of an unmanned aircraft. The battery 17 supplies electric power to each device that constitutes the flying body 20.

The flying body 20 can fly while communicating with the control system 30 by being equipped with the components described above.

Figure 6:
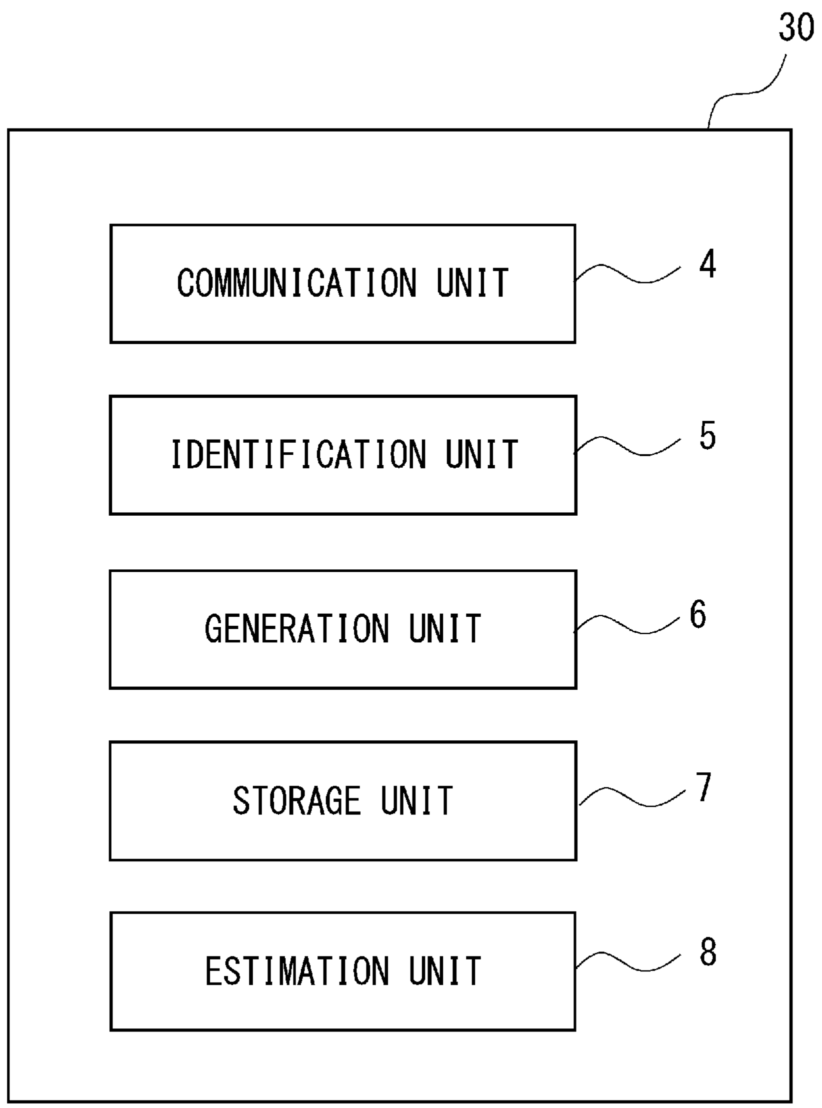
FIG. 6 is a block diagram illustrating a configuration of a control system according to the second example embodiment.

FIG. 6 is a block diagram of the control system 30 according to the second example embodiment. The control system 30 includes a communication unit 4, an identification unit 5, a generation unit 6, a storage unit 7, and an estimation unit 8. In the control system 30 according to the second example embodiment, similar reference numerals are respectively assigned to similar components according to the first example embodiment, and detailed explanation thereof will be omitted as appropriate.

The communication unit 4 executes wireless communication with the flying body 20 to obtain airframe information containing an airframe ID and positional information of the flying body 20. Performance information regarding performance of the flying body 20 may be contained in the airframe information. The performance information contains data regarding weight, a size, a flyable time, turning ability, resistance to wind, flight speed, and flight altitude of the flying body 20. The performance information may contain data regarding remaining battery life and a fuel remaining amount during flight. In addition, the performance information may contain information on whether it is a manned aircraft or an unmanned aircraft. The airframe information may contain information on whether it is an emergency aircraft for police, fire fighting, first aid, or the like.

The communication unit 4 executes wireless communication with the flying body 20 in accordance with frequency and transmission power defined in advance with the flying body 20. For example, the communication unit 4 may execute processing according to communication standards defined in 3GPP such as 5G or 4G, or may execute processing according to communication standards such as Wi-Fi (registered trademark) or Bluetooth (registered trademark). The communication unit 4 transmits a wireless signal to the flying body 20. The communication unit 4 receives a wireless signal from the flying body 20. This makes it possible to receive and transmit data and information between the flying body 20 and the control system 30.

The generation unit 6 is configured to generate a flight plan, which includes a flight path and flight schedule, on the basis of scheduled takeoff time (scheduled takeoff time) and movement information regarding a destination of the flying body 20 obtained by the communication unit 4. The scheduled takeoff time may be a current time or a time scheduled and registered in advance. The scheduled takeoff time and the destination may be information directly inputted to the control system 30 by a user of the flying body 20 or a user of the control system 30. Note that the destination may be a place name, a facility name, address, coordinates (latitude and longitude), or the like. Further, the destination may be an ID of takeoff/landing facility itself or the like, and the movement information may contain intermediate points between a takeoff place and a landing place.

The flight path is a migration path from the takeoff place to the landing place corresponding to the destination. The flight path is information indicating trajectory of target positions through which the flying body 20 passes. Moreover, a scheduled flight time may be associated with each of the target positions on the flight path. The flight path may be a set of three-dimensional coordinates respectively indicating the target positions, for example. Specifically, the flight path may be data in which the three-dimensional coordinates are arranged in chronological order. The flight path is generated by connecting the three-dimensional coordinates.

The generation unit 6 may generate the flight path on the basis of the performance information. For example, the generation unit 6 generates the flight path so as to satisfy the performance indicated by the performance information. The performance information contains the weight, the size, the flyable time, the turning ability, the resistance to wind, the flight speed, and the flight altitude of the flying body 20. The performance information may contain current remaining battery life or the fuel remaining amount. For example, in a case where motive power is provided by an electric motor, the remaining battery life is contained in the performance information. In a case where motive power is provided by an internal-combustion engine, a remaining amount of fuel such as gasoline is contained in the performance information. Alternatively, in a case where a fuel cell is used as the battery 17, a fuel remaining amount of hydrogen or the like is contained in the performance information. In a case where an internal-combustion engine and an electric motor are used together as motive power, both remaining battery life and a fuel remaining amount may be contained in the performance information.

For example, in a case where a flyable time is contained as the performance information, the generation unit 6 is configured to generate the flight path so as not to exceed the flyable time. Specifically, the generation unit 6 shortens a flight distance for a flying body 20 with a short flyable time to generate the flight path by which a flight time thereof does not exceed the flyable time. As a matter of course, the generation unit 6 can generate the flight path so as to satisfy the other performance than the flyable time. The communication unit 4 transmits the generated flight plan to the flying body 20.

The storage unit 7 is configured to store the airframe information obtained from the flying body 20 and the flight plan generated by the generation unit 6. Further, the storage unit 7 also stores an airframe ID table indicating a change pattern of the airframe IDs sent by the flying body 20.

Even though the airframe ID of the flying body 20 is changed, the identification unit 5 is configured to identify not only a change in positional information obtained at different timings but also the flying body 20 associated with the obtained airframe ID on the basis of the airframe ID table stored in the storage unit 7. Further, the identification unit 5 may refer to the flight plan in addition to the airframe IDs and the positional information to identify the flying body 20. The identification unit 5 can improve the accuracy of identifying the flying body 20 by checking the positional information of the flying body 20 in flight with the flight plan of the flying body 20.

The estimation unit 8 is configured to estimate, when the wireless communication between the control system 30 and the flying body 20 is cut off, an estimated position of the flying body 20 in flight on the basis of positional information of the flying body 20 at the time of communication disconnection and the flight plan. For example, the estimation unit 8 calculates speed and a direction of the flying body 20 from the positional information up to the time of the communication disconnection, and estimates the estimated position of the flying body 20 by using a flight path and a flight schedule of the flight plan after the communication is cut off.

When the communication is restored, the identification unit 5 is configured to identify the flying body 20 by comparing the airframe ID of the flying body 20 positioned at the estimated position with the airframe ID based on the airframe ID table. Moreover, the identification unit 5 is configured to identify the flying body 20 by comparing a position of the flying body 20 when the communication is restored and an estimated position of the flying body 20 at timing when the communication is restored.

Figure 7:
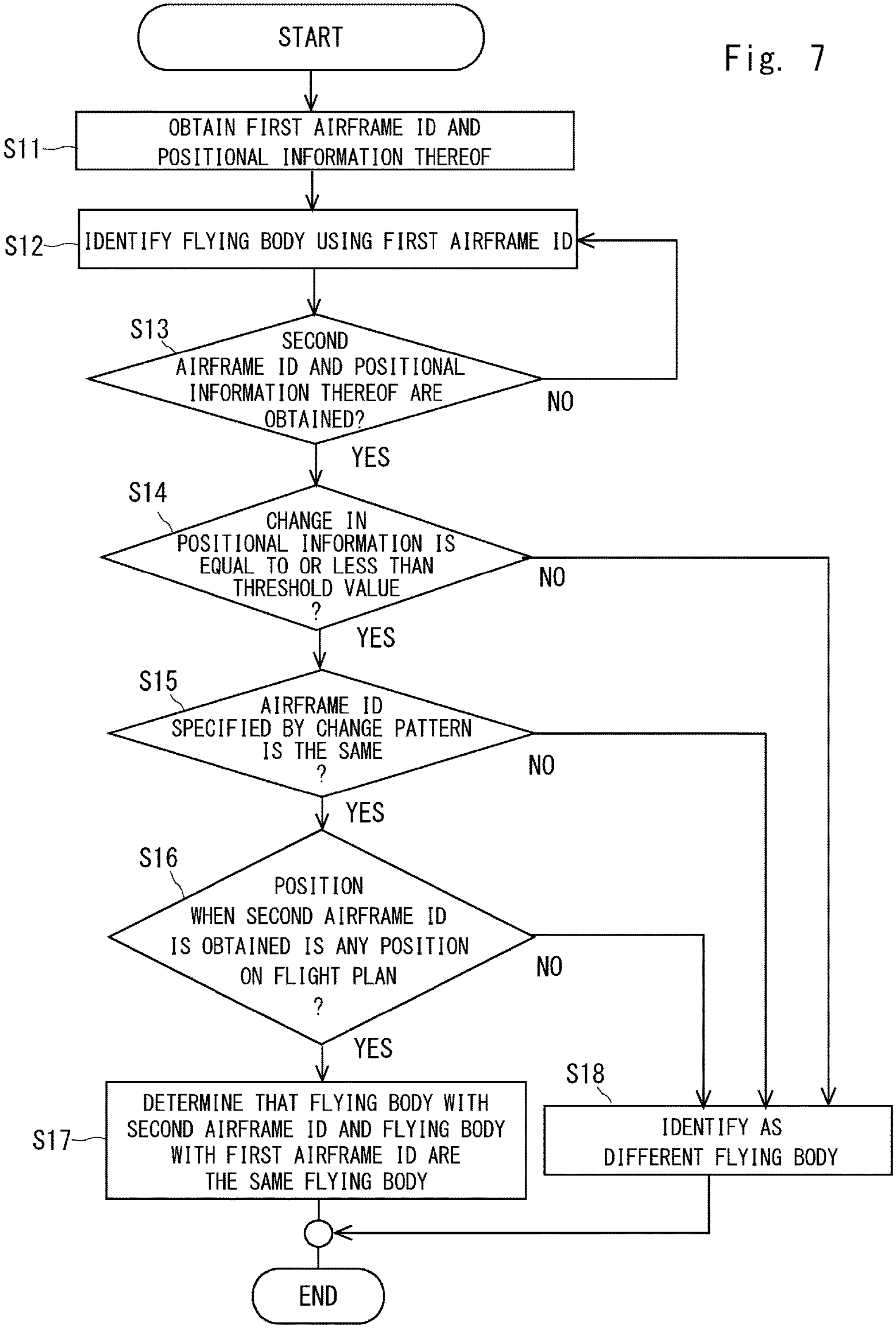
FIG. 7 is a flowchart illustrating an operation of the control system according to the second example embodiment.

FIG. 7 is a flowchart illustrating an operation of the control system 30 according to the second example embodiment. Since Steps S11 to S14 in FIG. 7 are similar to Steps S1 to S4 in FIG. 3, explanation thereof will be omitted. As well as FIG. 3, in order to distinguish airframe IDs, the first airframe ID described above is called a first airframe ID, and an airframe ID after change is called a second airframe ID.

When a change between positional information when a first airframe ID is obtained and positional information when a second airframe ID is obtained is equal to or less than a threshold value (S14, YES), the identification unit 5 refers to a change pattern of airframe IDs stored in the storage unit 7. A situation that the change in the positional information is equal to or less than the threshold value means that a change amount between the positional information is equal to or less than the threshold value. The identification unit 5 determines whether the second airframe ID is the same as an airframe ID specified by the change pattern of the airframe IDs of the flying body 20, which sent the first airframe ID, or not (S15).

In a case where it is determined that the second airframe ID is different from the airframe ID specified by the change pattern (S15, NO), the identification unit 5 identifies the flying body 20 that sends the second airframe ID as a flying body 20 different from the flying body 20 that sent the first airframe ID (S18). In a case where it is determined that the second airframe ID is the same as the airframe ID specified by the change pattern (S15, YES), the identification unit 5 refers to a flight plan stored in the storage unit 7 to determine whether a position when the second airframe ID is obtained is any position on the flight plan of the flying body 20 that sent the first airframe ID or not (S16). When the position when the second airframe ID is obtained does not exist in the flight plan (S16, NO), the identification unit 5 identifies the flying body 20 as a different flying body 20 (S18). When the position when the second airframe ID is obtained exists in the flight plan (S16, YES), the identification unit 5 determines that the flying body 20 that sends the second airframe ID is the same flying body 20 as the flying body 20 that sent the first airframe ID (S17). Further, FIG. 7 illustrates that the processing is executed in the order of Steps S14, S15, and S16, but the order of Steps S14, S15, and S16 may be changed. For example, the control system 30 may execute the process at Step S15 and then execute the process at Step S14 or S16, or may execute the process at Step S16 and then execute the process at Step S14 or S15.

Figure 8:
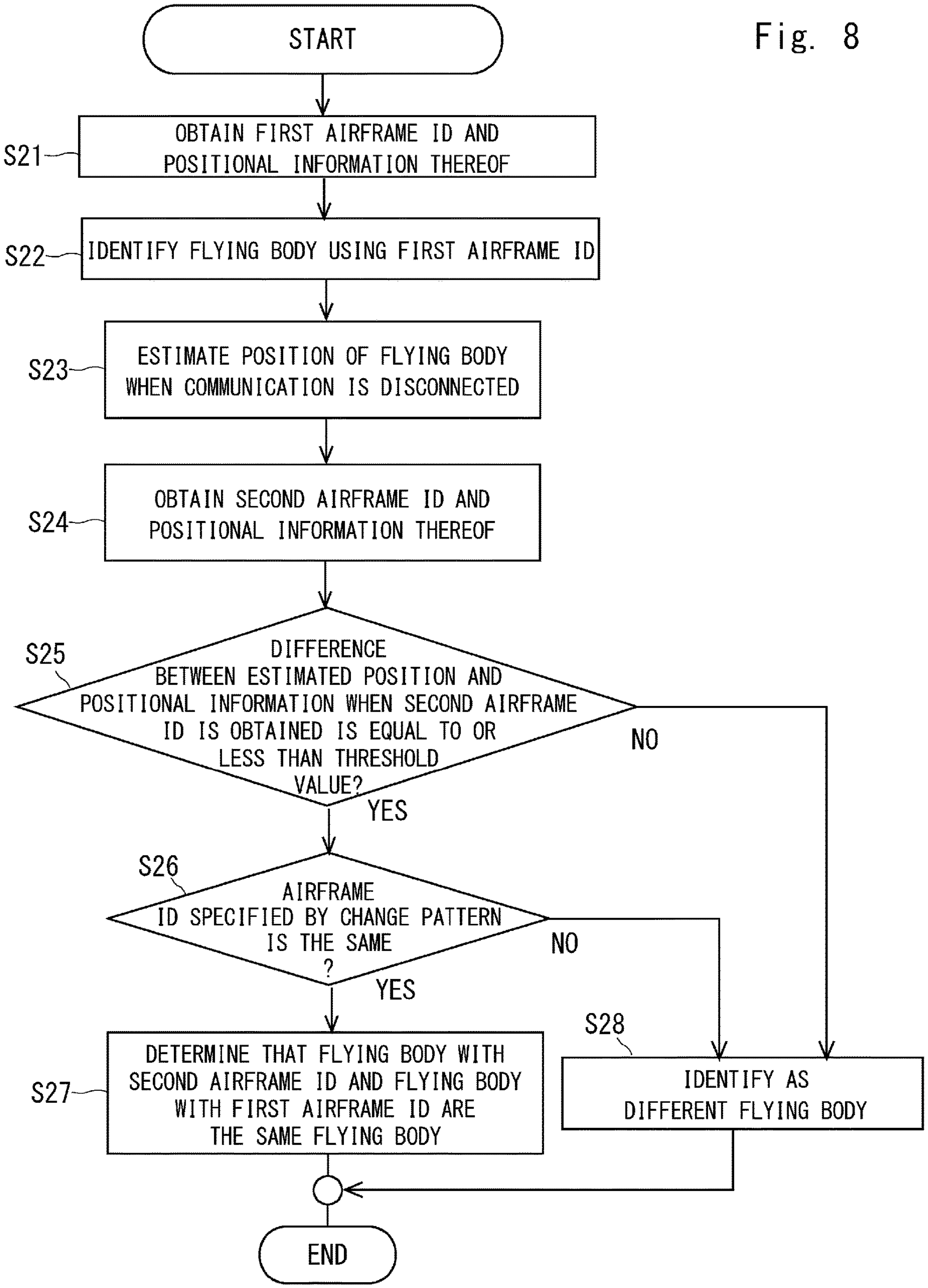
FIG. 8 is a flowchart illustrating an operation of the control system according to the second example embodiment.

FIG. 8 is a flowchart illustrating an operation of the control system 30 when communication with the flying body 20 is restored. Since Steps S21 and S22 in FIG. 8 are similar to Steps S1 to S2 in FIG. 3, explanation thereof will be omitted. As well as FIG. 3, in order to distinguish airframe IDs, the first airframe ID described above is called a first airframe ID, and an airframe ID after change is called a second airframe ID.

When communication between the communication unit 4 and the flying body 20 is cut off, the estimation unit 8 estimates an estimated position of the flying body 20 in flight on the basis of positional information of the flying body 20 at the time of communication disconnection and a flight plan stored in the storage unit 7 (S23). For example, in a case where the communication unit 4 does not receive a wireless signal from the flying body 20 for a predetermined period of time, or in a case where the communication unit 4 does not receive a response signal to a wireless signal transmitted by the communication unit 4, the estimation unit 8 may determine that the communication between the communication unit 4 and the flying body 20 is cut off. When the communication unit 4 obtains a first airframe ID at the time of communication restoration, the identification unit 5 identifies the flying body 20 by using the first airframe ID.

On the other hand, in a case where the communication unit 4 obtains a second airframe ID and positional information at the time of the communication restoration (S24), the identification unit 5 compares the estimated position of the flying body 20 estimated by the estimation unit 8 with the positional information when the second airframe ID is obtained. In a case where a difference between the estimated position and a position when the second airframe ID is obtained is larger than a threshold value (S25, NO), the identification unit 5 identifies the flying body 20 as a different flying body 20 (S28).

In a case where the difference between the estimated position and the position when the second airframe ID is obtained is equal to or less than the threshold value (S25, YES), the identification unit 5 refers to a change pattern of airframe IDs stored in the storage unit 7. The identification unit 5 determines whether the second airframe ID is the same as an airframe ID specified by the change pattern of the airframe IDs of the flying body 20, which sent the first airframe ID, or not (S26). In a case where it is determined that the second airframe ID is different from the airframe ID specified by the change pattern (S26, NO), the identification unit 5 identifies the flying body 20 that sends the second airframe ID as a flying body 20 different from the flying body 20 that sent the first airframe ID (S28). In a case where it is determined that the second airframe ID is the same as the airframe ID specified by the change pattern (S26, YES), the identification unit 5 determines that the flying body 20 that sends the second airframe ID and the flying body 20 that sent the first airframe ID are the same flying body 20 (S27). Further, FIG. 8 illustrates that the processing is executed in the order of Steps S25 and S26, but the order of Steps S25 and S26 may be changed. For example, the control system 30 may execute the process at Step S26 and then execute the process at Step S25.

As explained above, the control system 30 according to the second example embodiment can identify the flying body 20 by using the change in the positional information of the flying body 20, the change pattern of the airframe IDs, and the flight plan. Moreover, in a case where the communication with the flying body 20 is cut off, the control system 30 can determine whether the second airframe ID indicates the flying body 20 by using the comparison result of the change pattern of the positional information of the flying body 20 at the time of the communication restoration with the estimated position and the airframe ID even though the airframe ID of the flying body 20 is changed. As a result, even though the flying body 20 changes the airframe ID thereof in order to improve security, the control system 30 can identify the flying body 20.

Third Example Embodiment

Figure 9:
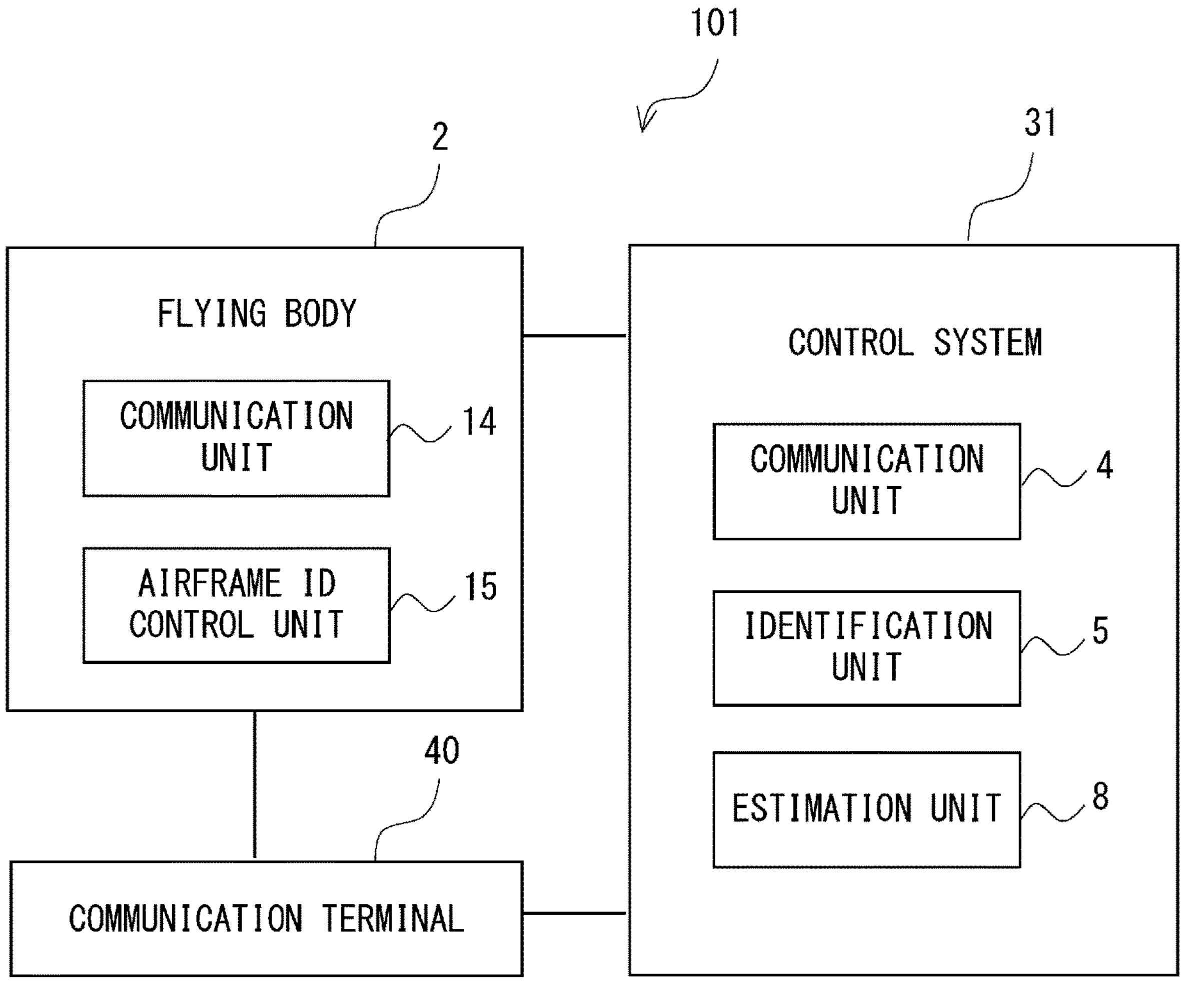
FIG. 9 is a block diagram illustrating a configuration of a flying body identification system according to a third example embodiment.

A flying body identification system 101 according to a third example embodiment will be described with reference to FIG. 9. The flying body identification system 101 according to the third example embodiment includes a flying body 2, a control system 31, and a communication terminal 40. The flying body 2 includes a communication unit 14 and an airframe ID control unit 15. The control system 31 includes a communication unit 4, an identification unit 5, and an estimation unit 8. The flying body identification system 101 according to the third example embodiment is a system for identifying the flying body 2 by using the communication terminal 40. In the flying body identification system 101 according to the third example embodiment, similar reference numerals are respectively assigned to similar components according to the first and second example embodiments, and detailed explanation thereof will be omitted as appropriate.

The communication terminal 40 is, for example, a smartphone, and has a communication function and a photographing function. The communication terminal 40 can communicate with the control system 31. For example, the communication terminal 40 may communicate with the control system 31 via a mobile network managed by a communication common carrier or the Internet. A user of the communication terminal 40 transmits, to the control system 31, an inquiry message that includes an image containing the flying body 2 and positional information of the communication terminal 40, whereby it is possible obtain information on the flying body 2. For example, the user of the communication terminal 40 photographs an image containing the flying body 2 when the flying body 2 is making noise or when a suspicious flying body 2 is flying, and then makes an inquiry to the control system 31.

Further, the communication terminal 40 directly executes wireless communication with the flying body 2, whereby it is possible to obtain an airframe ID. As the wireless communication, for example, a communication method such as Bluetooth (registered trademark) may be used. For example, in a case where the communication terminal 40 requests an airframe ID to a flying body 2, but cannot obtain a response from the flying body 2, the communication terminal 40 may determine the flying body 2 as a suspicious airframe, and notify police that the suspicious airframe is flying and staying around a position of the communication terminal 40.

The communication terminal 40 may transmit a message to the flying body 2 in addition to a request of the airframe ID. The message may be, for example, the content that the noise during flight is too loud, or the purpose of the stay. When there is a response from the flying body 2, the communication terminal 40 can obtain circumstances such as the purpose of the stay or the like of the flying body 2. On the other hand, in a case where the communication terminal 40 cannot obtain a response from the flying body 2, the communication terminal 40 may determine the flying body 2 as a suspicious airframe, and notify the police that the suspicious airframe is flying and staying around the position of the communication terminal 40.

When the communication unit 14 of the flying body 2 receives a signal for requesting an airframe ID from the control system 31, the communication terminal 40, or another flying body 2, for example, the communication unit 14 sends a response signal including the airframe ID in response to the request. Note that advisability of a response against a request of an airframe ID may be set in advance in accordance with a request source. Further, a user of the flying body 2 may determine the advisability of the response against the request of the airframe ID and the response content.

The communication unit 4 of the control system 31 receives, from the communication terminal 40, the image containing the flying body 2 photographed in the communication terminal 40 and the positional information of the communication terminal 40. The estimation unit 8 uses background information contained in the received image and the positional information to estimate an estimated position of the flying body 2. The estimation unit 8 specifies the position of the communication terminal 40 at the time of image photographing from the positional information of the communication terminal 40. Moreover, the estimation unit 8 estimates the position of the flying body 2 in the vicinity of the position of the communication terminal 40 from the background information contained in the received image. For example, the estimation unit 8 may estimate a position of a building, a steel tower, a mountain, a river, sea, or the like, which is contained in the background information, by using map information or the like. Further, in a case where a landmark with a clear position is contained in the received background information, the estimation unit 8 may estimate the position of the flying body 2 from the background information without using the positional information of the communication terminal 40. Moreover, the estimation unit 8 may estimate the position of the flying body 2 by estimating a distance between the flying body 2 and the background information in the image. Further, the estimation unit 8 may use a photographing direction of the communication terminal 40, that is, an angle of the communication terminal 40 when the communication terminal 40 is held up toward the sky to photograph the flying body 2, for estimating the position of the flying body 2. Note that the communication unit 4 can send, via the mobile network managed by the communication common carrier, a request for a photographed image of the sky in a predetermined area or the positional information of the communication terminal 40 photographing the image to the communication terminal 40 existing within the predetermined area.

The identification unit 5 uses the estimated position of the flying body 2 estimated by the estimation unit 8 to identify the flying body 2. For example, the identification unit 5 identifies the flying body 2 positioned at the estimated position by comparing the positional information of the flying body 2 thus controlled with the estimated position. Specifically, the identification unit 5 may identify the flying body 2 existing at the estimated position as the flying body 2 thus controlled in a case where a distance between a position of the flying body 2 thus controlled and the estimated position is shorter than a distance defined in advance.

The communication unit 4 transmits information on the flying body 2 thus identified to the communication terminal 40. For example, the communication unit 4 transmits information such as an airframe ID, airframe information, and a destination of the flying body 2 thus identified to the communication terminal 40. As a result, the user of the communication terminal 40 can obtain the information on the flying body 2. For example, the airframe ID of the flying body 2 may be associated in advance with the information such as the airframe information and the destination.

The communication unit 4 may transmit, to the flying body 2, a request signal for requesting the airframe ID toward the estimated position of the flying body 2 estimated by the estimation unit 8 by using directional radio waves. When the communication unit 4 receives a response signal to the request signal, the identification unit 5 can identify the flying body 2 by using the airframe ID contained in the response signal. The identification unit 5 may refer to a storage unit 7 storing the information on the flying body 2 to identify the flying body 2 corresponding to the airframe ID.

In a case where the airframe ID of the flying body 2 cannot be identified, the identification unit 5 determines that the flying body 2 positioned at the estimated position is a suspicious flying body 2, and the communication unit 4 transmits, to the communication terminal 40, a message or the like indicating that the flying body 2 is determined as the suspicious flying body 2 by the identification unit 5. At this time, the communication unit 4 may notify the police that the suspicious flying body 2 is flying and staying at the estimated position. The case where the communication unit 4 cannot identify the airframe ID of the flying body 2 may be, for example, the case where no airframe ID is contained in the response signal, or the case where no flying body is associated with the airframe ID contained in the response signal.

Figure 10:
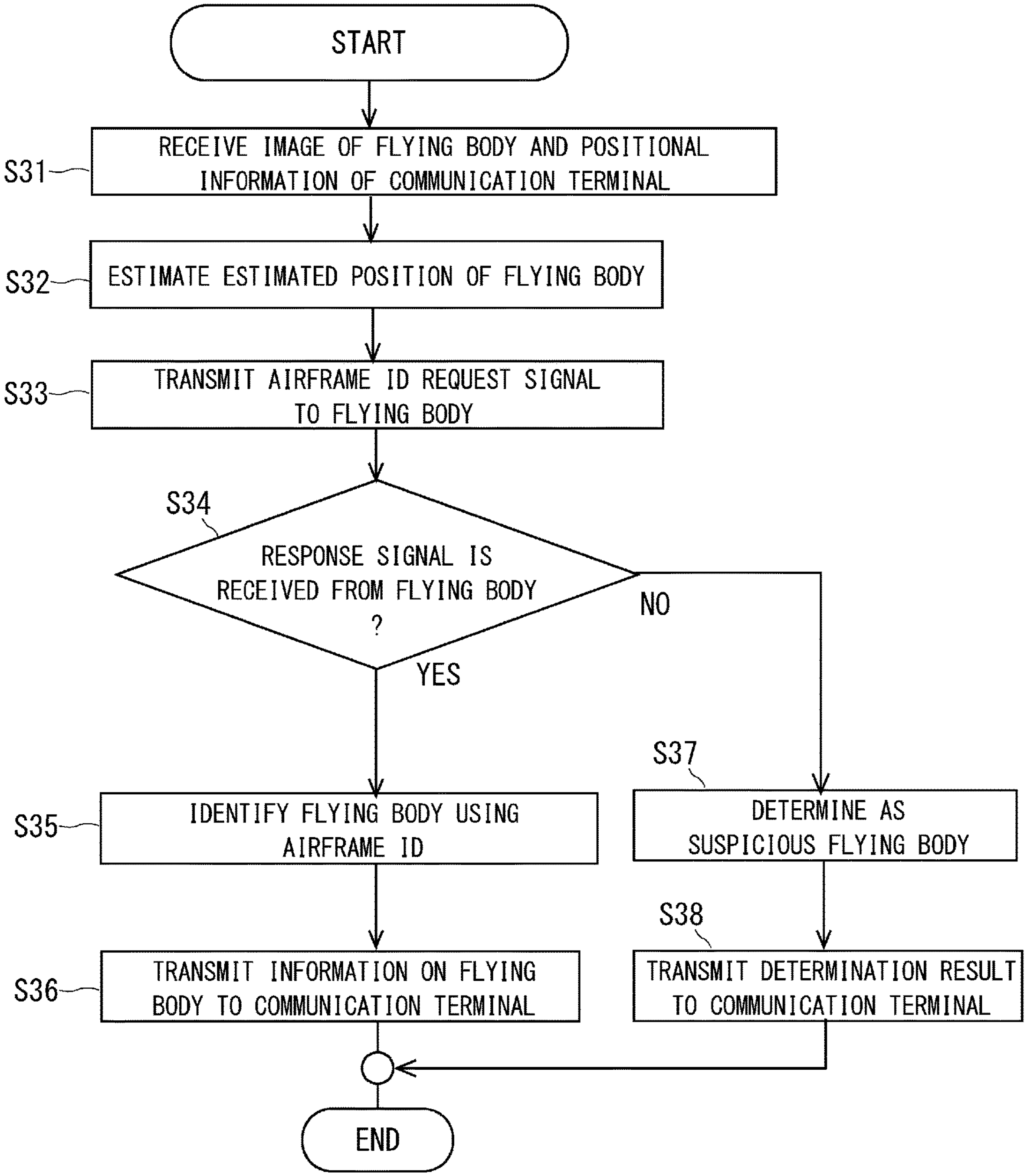
FIG. 10 is a flowchart illustrating an operation of a control system according to the third example embodiment.

FIG. 10 is a flowchart illustrating an operation of the control system 31 according to the third example embodiment. Hereinafter, the operation of the control system 31 will be described with reference to FIG. 10.

First, the communication unit 4 receives, from the communication terminal 40, an image including a flying body 2 photographed by the communication terminal 40 and positional information of the communication terminal 40 (S31). The estimation unit 8 uses background information contained in the received image and the positional information to estimate an estimated position of the flying body 2 (S32). The communication unit 4 transmits, to the flying body 2, a request signal for requesting an airframe ID toward the estimated position of the flying body 2 estimated by the estimation unit 8 by using directional radio waves (S33). When the communication unit 4 receives a response signal to the request signal (S34, YES), the identification unit 5 identifies the flying body 2 by using an airframe ID contained in the response signal (S35). The communication unit 4 transmits information on the flying body 2 thus identified to the communication terminal 40 (S36). On the other hand, when the communication unit 4 cannot receive any response signal to the request signal (S34, NO), the identification unit 5 determines the flying body 2 positioned at the estimated position as a suspicious flying body 2 (S37). The communication unit 4 transmits a determination result to the communication terminal 40 (S38). Further, in a case where it is determined at Step S34 that there is no flying body 2 associated with the airframe ID contained in the received response signal, the identification unit 5 may determine that the flying body 2 positioned at the estimated position is a suspicious flying body 2. Further, in a case where it is determined at Step S34 that no airframe ID is contained in the received response signal, the identification unit 5 may determine that the flying body 2 positioned at the estimated position is a suspicious flying body 2.

As described above, the control system 31 according to the third example embodiment can identify the flying body 2 on the basis of the image received from the communication terminal 40 and the positional information of the communication terminal 40. As a result, the control system 31 can provide the user of the communication terminal 40 information on the flying body 2 and a determination result as to whether the flying body 2 is a suspicious flying body 2 or not.

Fourth Example Embodiment

Figure 11:
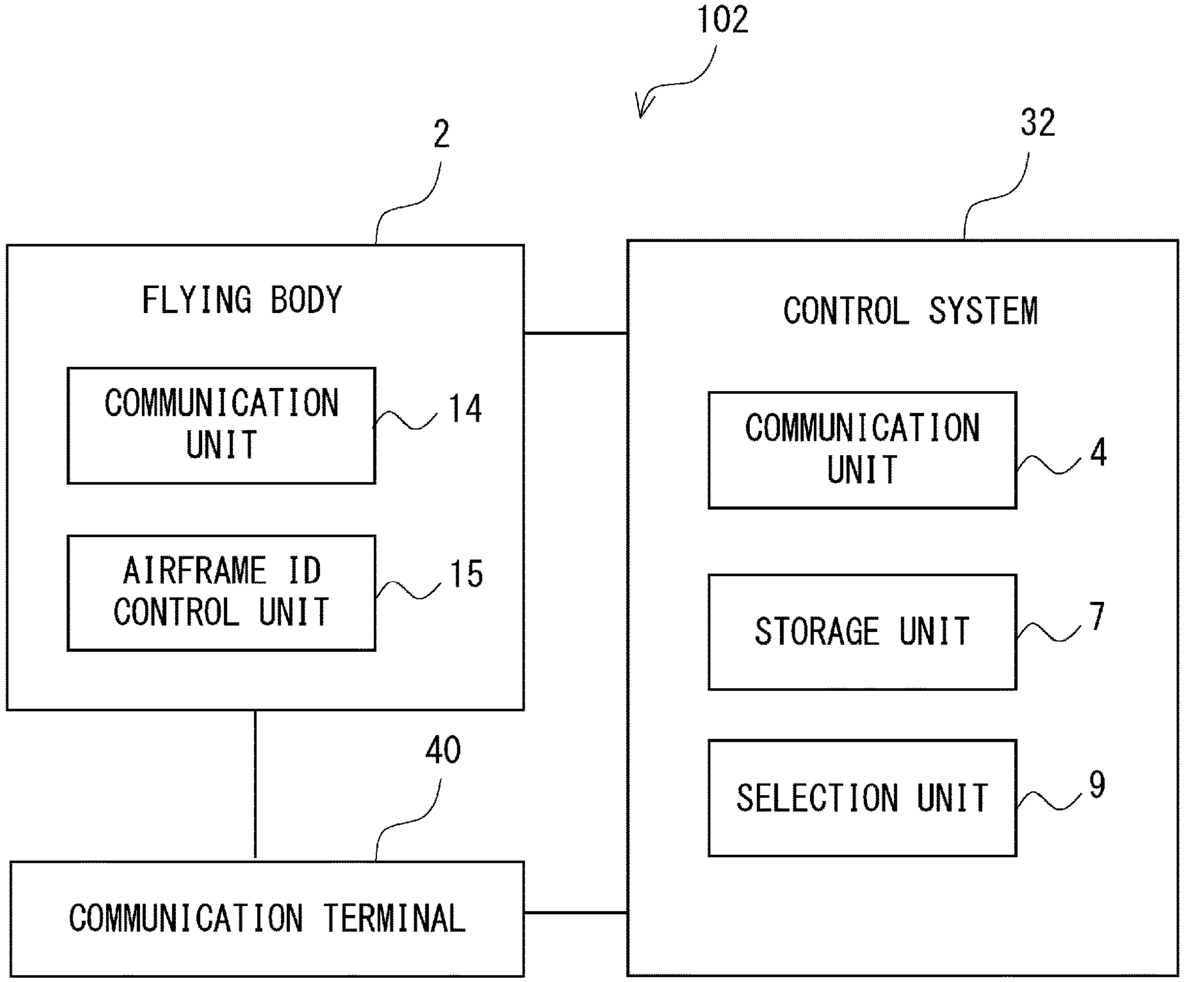
FIG. 11 is a block diagram illustrating a configuration of a flying body identification system according to a fourth example embodiment.

FIG. 11 is a block diagram illustrating a configuration of a flying body identification system 102 according to a fourth example embodiment. The flying body identification system 102 according to the fourth example embodiment includes a flying body 2, a control system 32, and a communication terminal 40. The flying body 2 includes a communication unit 14 and an airframe ID control unit 15. The control system 32 includes a communication unit 4, a storage unit 7, and a selection unit 9. The flying body identification system 102 according to the fourth example embodiment is a system that discloses suitable information to the communication terminal 40 in accordance with an authority level of the communication terminal 40. In the flying body identification system 102 according to the fourth example embodiment, similar reference numerals are respectively assigned to similar components according to the first to third example embodiments, and detailed explanation thereof will be omitted as appropriate.

The communication terminal 40 can obtain an airframe ID by wirelessly communicating with the flying body 2. As the wireless communication, for example, a communication method such as Bluetooth (registered trademark) may be used. An authority level is assigned in advance to the communication terminal 40. The communication terminal 40 transmits, to the control system 32, an inquiry message including the airframe ID obtained from the flying body 2 and the authority level, whereby it is possible to obtain information on the flying body 2 from the control system 32.

The storage unit 7 of the control system 32 according to the fourth example embodiment manages and stores the airframe ID of the flying body 2 and a plurality of pieces of information regarding the flying body 2 indicated by the airframe ID so as to be associated with each other. The storage unit 7 may manage the plurality of pieces of information regarding the flying body 2 and a plurality of authority levels so as to be associated with each other. For example, as illustrated in FIG. 12, the storage unit 7 stores the plurality of pieces of information regarding the flying body 2 in accordance with the authority levels. The information of authority level 3 corresponds to personal information of a user of the flying body 2, and the information of authority level 2 corresponds to information on a flight path and remaining battery life. The information of authority level 1 corresponds to information on a destination of the flying body 2. These are only examples, and may be configured so that an administrator or the user of the flying body 2 can set the authority level to be associated with the information of the flying body 2.

In a case where the communication unit 4 receives, from the communication terminal 40, an inquiry message including an airframe ID and an authority level assigned to the communication terminal 40, the selection unit 9 refers to the storage unit 7. The selection unit 9 selects information to be transmitted to the communication terminal 40 from among the plurality of pieces of information regarding the flying body 2 associated with the airframe ID in accordance with the authority level of the communication terminal 40. The communication unit 4 transmits the information on the flying body 2 selected by the selection unit 9 to the communication terminal 40.

The selection unit 9 can select the information regarding the flying body 2 associated with the authority level assigned to the communication terminal 40 as follows. For example, in response to an inquiry from a communication terminal 40 with authority level 3, owned by police, the selection unit 9 selects the information of the authority level 3. Similarly, in response to an inquiry from a communication terminal 40 with authority level 2, owned by a traffic information center, the selection unit 9 selects the information of the authority level 2. Further, in response to an inquiry from a communication terminal 40 with authority level 1, owned by a general person, the selection unit 9 selects the information of the authority level 1.

Alternatively, the selection unit 9 may select the information regarding the flying bodies 2 respectively associated with the authority level assigned to the communication terminal 40 and an authority level lower than the authority level. Specifically, the selection unit 9 selects the information of the authority levels 1 to 3 in response to the inquiry from the communication terminal 40 with the authority level 3, owned by the police, and selects the information of the authority levels 1 and 2 in response to the inquiry from the communication terminal 40 with the authority level 2, owned by the traffic information center. The selection unit 9 selects the information of the authority level 1 in response to the inquiry from the communication terminal 40 with the authority level 1, owned by a general person.

The selection unit 9 does not select the information on the flying body 2 in response to an inquiry for information of an authority level higher than the authority level assigned to the communication terminal 40. In this case, the communication unit 4 may notify the communication terminal 40 that the information on the flying body 2 cannot be provided.

As a result, the selection unit 9 can select the information to be transmitted to the communication terminal 40 in accordance with the authority level of the communication terminal 40.

Figure 13:
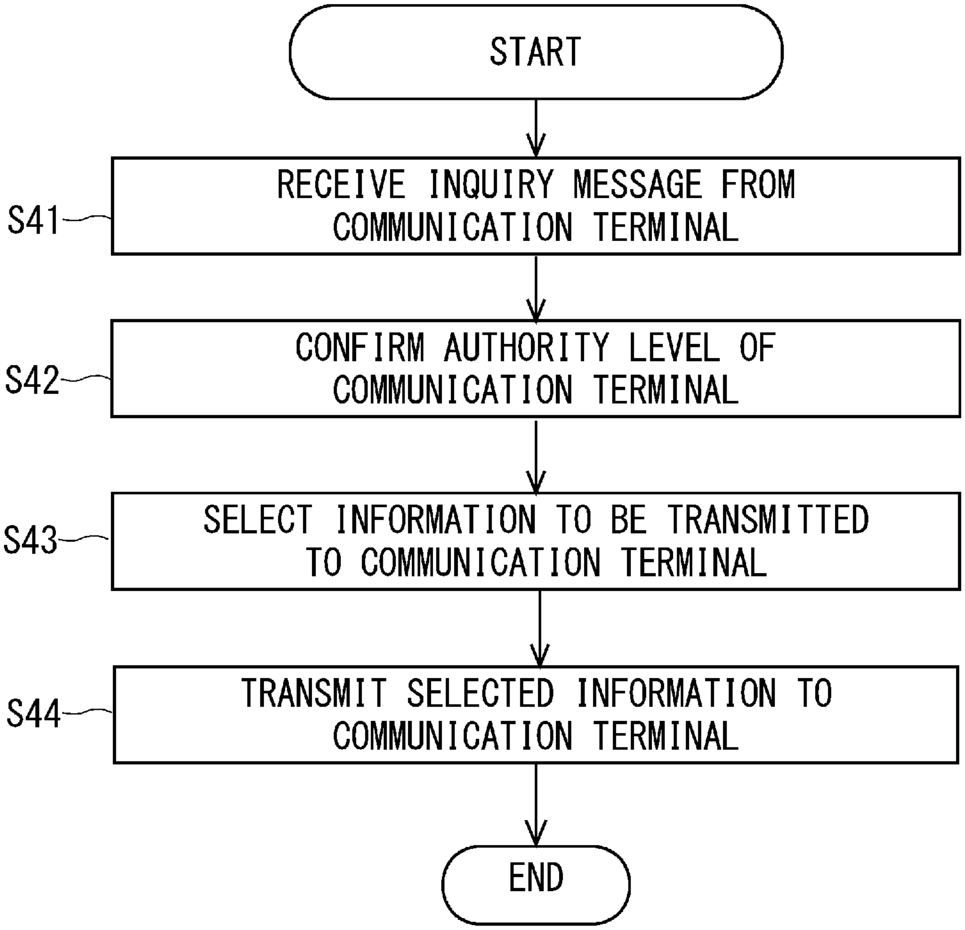
FIG. 13 is a flowchart illustrating an operation of a control system according to the fourth example embodiment.

FIG. 13 is a flowchart illustrating an operation of the control system 32 according to the fourth example embodiment.

The communication unit 4 receives, from the communication terminal 40, an inquiry message including an airframe ID and an authority level assigned to the communication terminal 40 (S41). The selection unit 9 confirms the authority level included in the inquiry message of the communication terminal 40 (S42). The selection unit 9 refers to the storage unit 7 to select information on the flying body 2 corresponding to the authority level of the communication terminal 40 (S43). The communication unit 4 transmits the information selected by the selection unit 9 to the communication terminal 40 (S44).

As explained above, the control system 32 according to the fourth example embodiment provides the information on the flying body 2 in accordance with the authority level of the communication terminal 40. As a result, the control system 32 can suppress leakage of the information regarding the flying body 2, and this makes it possible to improve security. The control system 32 can appropriately provide the information on the flying body 2 depending on the situation while improving the security thereof.

Fifth Example Embodiment

Figure 14:
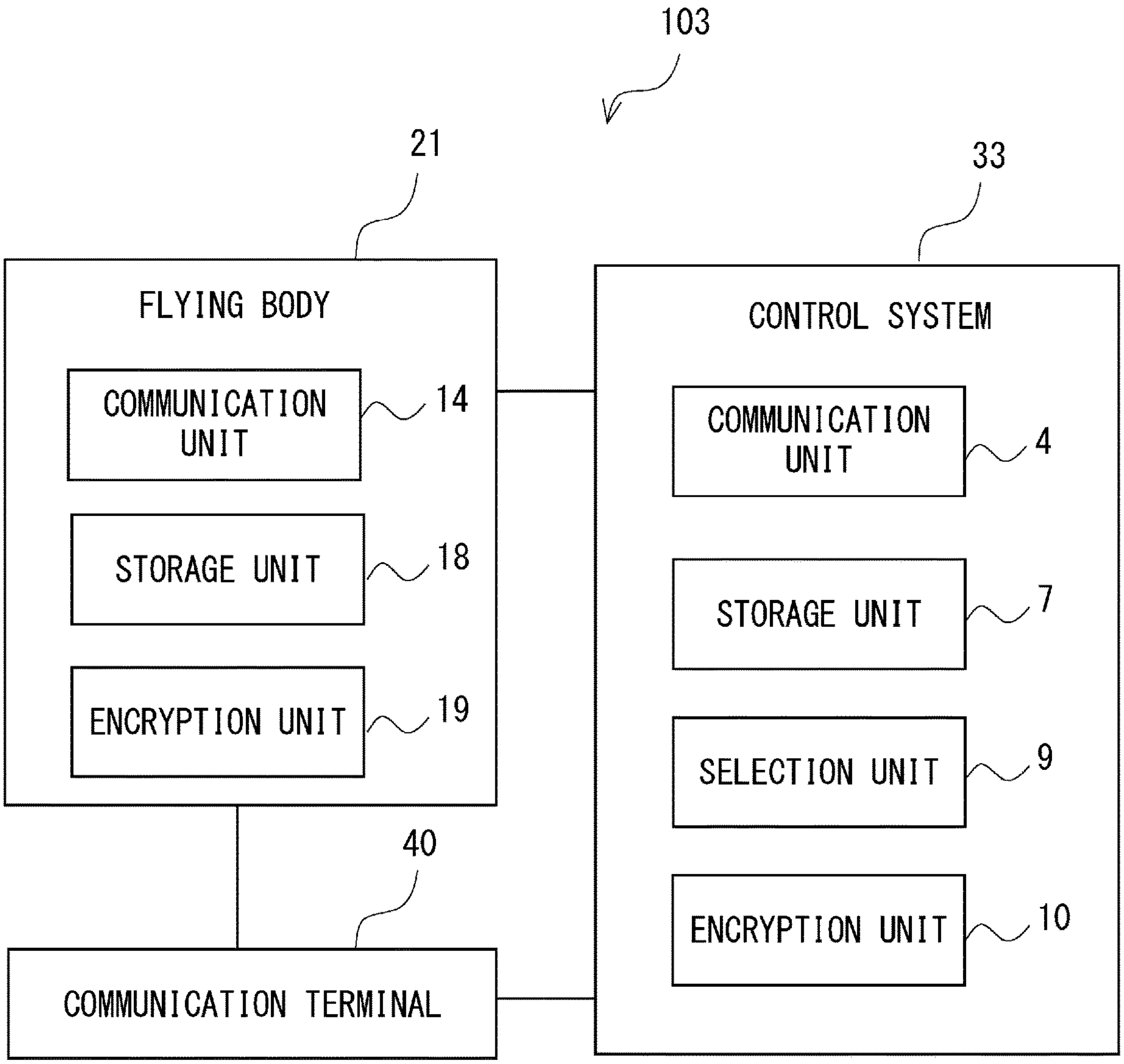
FIG. 14 is a block diagram illustrating a configuration of a flying body identification system according to a fifth example embodiment.

FIG. 14 is a block diagram illustrating a configuration of a flying body identification system 103 according to a fifth example embodiment. The flying body identification system 103 according to the fifth example embodiment includes a flying body 21, a control system 33, and a communication terminal 40. The flying body 21 includes a communication unit 14, a storage unit 18, and an encryption unit 19. The control system 33 includes a communication unit 4, a storage unit 7, a selection unit 9, and an encryption unit 10. In the flying body identification system 103 according to the fifth example embodiment, similar reference numerals are respectively assigned to similar components according to the first to fourth example embodiments, and detailed explanation thereof will be omitted as appropriate. The flying body 21 according to the fifth example embodiment can encrypt information held by itself in accordance with an authority level, and send it. Further, as well as the flying body identification system 102 according to the fourth example embodiment, the flying body identification system 103 according to the fifth example embodiment is a system that discloses suitable information to the communication terminal 40 in accordance with an authority level of the communication terminal 40.

The storage unit 18 of the flying body 21 stores flying body information that is information regarding the flying body 21 and an authority level thereof so as to be associated with each other. For example, as illustrated in FIG. 12 described above, the storage unit 18 stores a plurality of pieces of flying body information regarding the flying body 21 in accordance with the authority level. For example, information of authority level 3 corresponds to personal information of a user of the flying body 21, and information of authority level 2 corresponds to information on a flight path and remaining battery life. Information of authority level 1 corresponds to information on a destination of the flying body 21. These are only examples, and may be configured so that an administrator or the user of the flying body 21 can set the authority level to be associated with the flying body information of the flying body 21. Namely, the flying body 21 can set which information among the information to be sent is to be disclosed to which authority level. Further, the flying body 21 set which information is to be sent.

The encryption unit 19 is configured to encrypt flying body information associated with a predetermined authority level. For example, when the predetermined authority level is 3, the encryption unit 19 encrypts flying body information associated with authority level 3. Further, when the predetermined authority level is 1 to 3, the encryption unit 19 may encrypt flying body information associated with all authority level 1 to 3. The communication unit 14 is configured to send the encrypted flying body information. Note that the flying body information is airframe information, and contains a flight path, personal information of an airframe owner or an airframe administrator, payloads, the airframe information, connection information, airframe statuses such as presence or absence of failure (or malfunction) and remaining energy life, and maintenance information, for example.

The communication terminal 40 has an authority level according to a user's status, and can decrypt the encrypted flying body information received from the flying body 21. The user of the communication terminal 40 is, for example, police, a parking lot manager, a general person, or the like. For example, the police own a communication terminal 40 to which the authority level 3 is assigned; the parking lot manager owns a communication terminal 40 to which the authority level 2 is assigned; and the general person owns a communication terminal 40 to which the authority level 1 is assigned.

For example, when the encryption unit 19 encrypts the flying body information on the flying body 21 associated with the authority level 3 and the communication unit 14 sends the encrypted flying body information, the communication terminal 40 with the authority level 3, owned by the police, can decrypt the encrypted flying body information on the flying body 21 with the authority level 3. In this case, the communication terminal 40 with the authority level 2, owned by the parking lot manager, or the communication terminal 40 with the authority level 1, owned by the general person, cannot decrypt the encrypted flying body information of the authority level 3. Further, the communication terminal 40 with the authority level 3 can receive flying body information associated with the authority level 1 or 2. Further, the communication terminal 40 with the authority level 3 can also decrypt the encrypted flying body information with the authority level 1 or 2. Namely, the communication terminal 40 can obtain the flying body information associated with its own authority level and an authority level lower than the own authority level.

As explained above, the flying body 21 according to the fifth example embodiment can encrypt information held therein in accordance with the authority level, and send it. This makes it possible to convey information to the owner of the communication terminal 40 with a suitable authority level while improving security.

The control system 33 according to the fifth example embodiment can also disclose, in response to an inquiry from the communication terminal 40, suitable information to the communication terminal 40 in accordance with the authority level of the communication terminal 40. As illustrated in FIG. 14, in the control system 33 according to the fifth example embodiment, the encryption unit 10 is added as compared with the control system 32 according to the fourth example embodiment.

The encryption unit 10 of the control system 33 is configured to encrypt information on the flying body 21 associated with a predetermined authority level. For example, when the predetermined authority level is 3, the encryption unit 10 encrypts flying body information on the flying body 21 associated with the authority level 3. Note that, when the predetermined authority level is 1 to 3, the encryption unit 10 may encrypt flying body information associated with all the authority level 1 to 3. The communication unit 4 sends the encrypted information on the flying body 21. The communication terminal 40 with the authority level 3 decrypts the encrypted information on the flying body 21 with the authority level 3, whereby it is possible to obtain the information on the flying body 21 with the authority level 3. Hereinafter, an operation of the control system 33 will be described with reference to FIG. 15.

Figure 15:
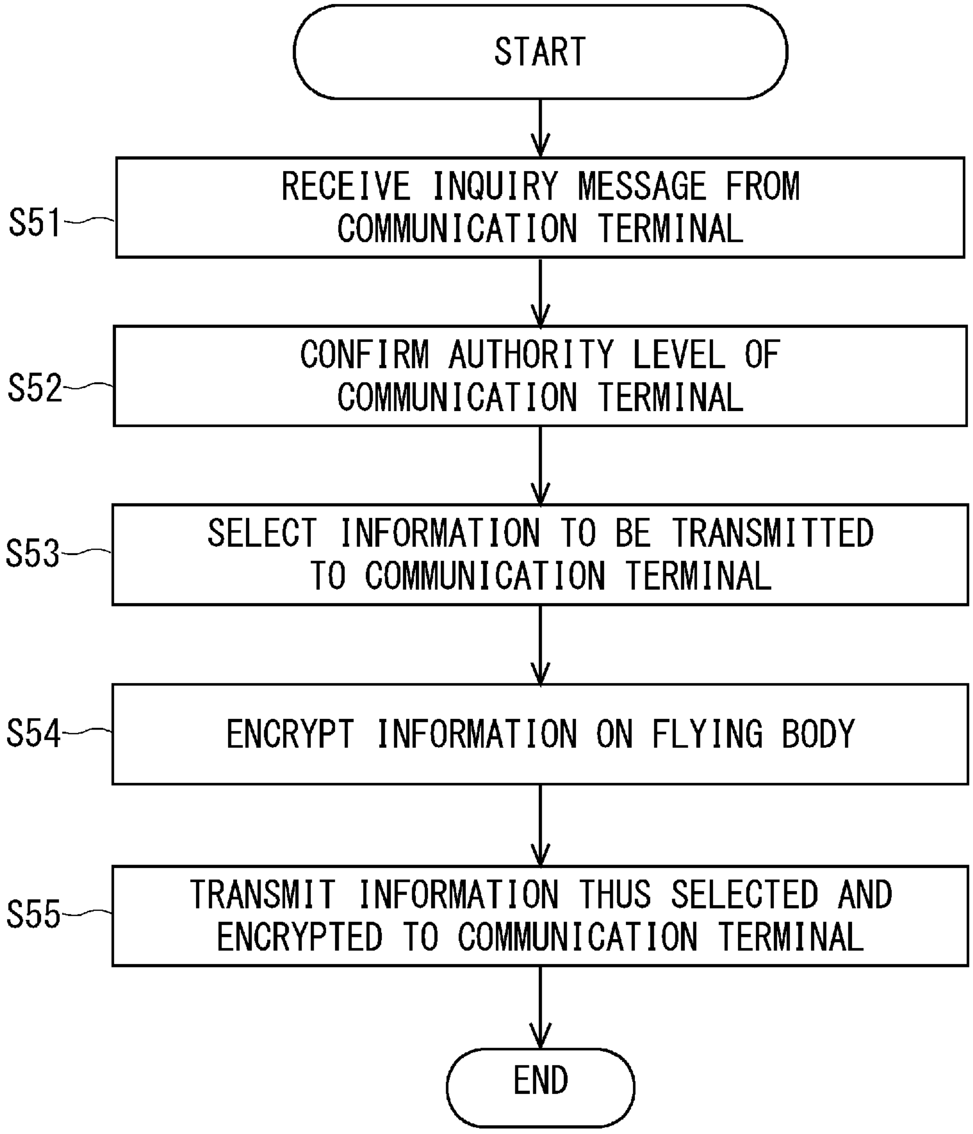
FIG. 15 is a flowchart illustrating an operation of a control system according to the fifth example embodiment.

FIG. 15 is a flowchart illustrating an operation of the control system 33 according to the fifth example embodiment. First, the communication unit 4 receives, from the communication terminal 40, an inquiry message including an airframe ID and an authority level assigned to the communication terminal 40 (S51). The selection unit 9 confirms an authority level of the communication terminal 40 included in the inquiry message (S52). When the selection unit 9 confirms that the authority level of the communication terminal 40 is 3, the selection unit 9 refers to the storage unit 7 to select information on a flying body 21 corresponding to authority level 3 (S53). When a predetermined authority level is 3, the encryption unit 10 encrypts information on a flying body 21 associated with the authority level 3 (S54). The communication unit 4 transmits, to the communication terminal 40, the information regarding the flying body 21, which is selected by the selection unit 9, encrypted by the encryption unit 10, and associated with the authority level 3 (S55).

As explained above, the control system 33 according to the fifth example embodiment can prevent interception by another communication terminal 40 by providing the encryption unit 10. As a result, the control system 33 can further suppress leakage of information on the flying body 21, and this makes it possible to improve security of a communication system between the communication terminal 40 and the control system 33. The control system 33 can appropriately provide the information on the flying body 21 depending on the situation while improving the security thereof.

In the fourth or fifth example embodiment, the flying body 2 and the flying body 21 may directly transmit, to the communication terminal 40, emergency information containing failure and a landing place without passing through the control system 32 and the control system 33 in case of emergency. Further, the flying body 2 and the flying body 21 may broadcast the emergency information to communication terminals 40 on earth, which exist at the landing place and a landing path. The landing path is a flight path from a place where an emergent situation such as failure occurs in the flying body 2 and the flying body 21 to a place where the flying body 2 and the flying body 21 lands at a landing point. The flying body 2 and the flying body 21 may broadcast the emergency information to the communication terminal 40 on earth via a mobile network managed by a communication common carrier without passing through the control system 32 and the control system 33. As a result, the flying body 2 and the flying body 21 can immediately transmit the emergency information to the communication terminal 40 even though communication between the control system 32 and the control system 33 is cut off at the time of emergency. For that reason, it is possible to suppress damage caused by an accident.

Figure 16:
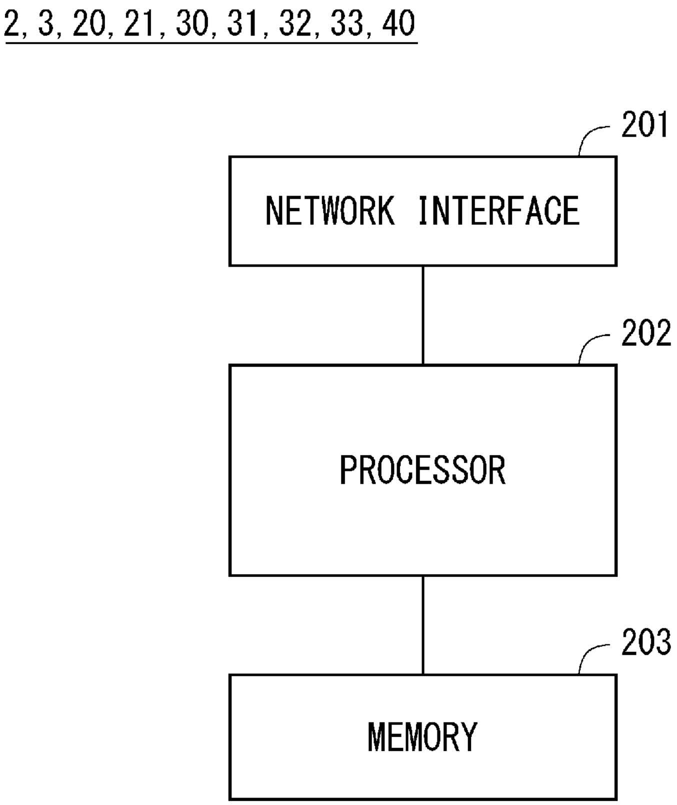
FIG. 16 is a block diagram illustrating a configuration example of a control device in a flying body, a control system, and a communication terminal according to each of the example embodiments.

FIG. 16 is a block diagram illustrating a configuration example of a control device in each of the flying body 2, the flying body 20, the flying body 21, the control system 3, the control system 30, the control system 31, the control system 32, the control system 33, and the communication terminal 40 according to each of the example embodiments. Referring to FIG. 16, each of these control devices includes a network interface 201, a processor 202, and a memory 203. The network interface 201 may be used for communicating with a network node (e.g., eNB, MME, or P-GW). The network interface 201 may include a network interface card (NIC) conformable to IEEE 802.3 series, for example. Here, the eNB represents evolved Node B; the MME represents Mobility Management Entity; and the P-GW represents Packet Data Network Gateway. The IEEE represents Institute of Electrical and Electronics Engineers.

The processor 202 reads out software (a computer program) from the memory 203 and executes it, thereby executing the processes of the flying body 2, the flying body 20, the flying body 21, the control system 3, the control system 30, the control system 31, the control system 32, the control system 33, or the communication terminal 40, which has been described in each of the example embodiments described above. The processor 202 may be a microprocessor, an MPU, or a CPU, for example. The processor 202 may include a plurality of processors.

The memory 203 is configured by a combination of a volatile memory and a non-volatile memory. The memory 203 may include a storage remotely located from the processor 202. In this case, the processor 202 may access the memory 203 via an unillustrated I/O (Input/Output) interface.

In the example of FIG. 16, the memory 203 is used for storing a group of software modules. The processor 202 reads out the group of software modules from the memory 203 and executes it, thereby being capable of executing the operation and the processes of each of the flying body 2, the flying body 20, the flying body 21, the control system 3, the control system 30, the control system 31, the control system 32, the control system 33, and the communication terminal 40, which have been described in the example embodiments described above.

As described with reference to FIG. 16, the processor included in the control device of each of the flying body 2, the flying body 20, the flying body 21, the control system 3, the control system 30, the control system 31, the control system 32, the control system 33, and the communication terminal 40 according to the example embodiments described above executes one or a plurality of programs containing a group of instructions for causing a computer to execute the operation and the processes, which have been described in the example embodiments described above.

In the examples described above, various kinds of control programs can be stored using various types of non-transitory computer readable mediums (non-transitory computer readable mediums), and can be supplied to the computer. The non-transitory computer readable mediums include various types of tangible storage mediums (tangible storage mediums). Examples of the non-transitory computer readable mediums include magnetic recording media (for example, floppy disks, magnetic tapes, and hard disk drives), magneto-optical recording media (for example, magneto-optical discs), CD-ROMs, CD-Rs, CD-R/Ws, and semiconductor memories (for example, mask ROMs, PROMs (Programmable ROMs), EPROMs (Erasable PROMs), flash ROMs, and RAMs). Further, the programs may be supplied to the computer by various types of transitory computer readable mediums (transitory computer readable mediums). Examples of the transitory computer readable mediums include electrical signals, optical signals, and electromagnetic waves. The transitory computer readable mediums can supply programs to the computer via wired communication channels, such as electric wires and optical fibers, or wireless communication channels.

As described above, the present invention has been described with reference to the example embodiments, but the present is not limited by the above. Various modifications that can be understanded by a person having ordinary skill in the art can be made in the configuration and details of the present invention within the scope of the invention.

A part or all of the example embodiments described above can be described as Supplementary Notes described below, but are not limited to the followings.

(Supplementary Note 1)

A flying body identification system comprising:

a flying body;

a communication terminal configured to obtain an airframe ID of the flying body; and a control system configured to control an operation of the flying body, wherein the control system is also configured to:

manage the airframe ID and a plurality of pieces of information regarding the flying body indicated by the airframe ID so as to be associated with each other;

select, in a case where an inquiry message containing the airframe ID and an authority level assigned to the communication terminal is received from the communication terminal, information to be transmitted to the communication terminal from among the plurality of pieces of information regarding the flying body associated with the airframe ID in accordance with the authority level of the communication terminal; and transmit the selected information to the communication terminal.

(Supplementary Note 2)

The flying body identification system according to Supplementary Note 1, wherein the control system is further configured to:

manage the plurality of pieces of information regarding the flying body and a plurality of authority levels so as to be associated with each other; and select information regarding the flying body associated with the authority level assigned to the communication terminal, or select information regarding the flying body associated with the authority level assigned to the communication terminal and an authority level lower than the authority level.

(Supplementary Note 3)

The flying body identification system according to Supplementary Note 1 or 2, wherein the control system is further configured to encrypt information on the flying body, the information being associated with a predetermined authority level.

(Supplementary Note 4)

The flying body identification system according to any one of Supplementary Notes 1 to 3, wherein in case of emergency, the flying body is configured to directly transmit emergency information to the communication terminal without passing through the control system, the emergency information containing failure and a landing place.

(Supplementary Note 5)

The flying body identification system according to Supplementary Note 4, wherein the flying body is further configured to broadcast the emergency information to a communication terminal on earth, the communication terminal existing at the landing place and on a landing path.

(Supplementary Note 6)

The flying body identification system according to Supplementary Note 5, wherein the flying body is further configured to broadcast the emergency information to the communication terminal on earth via a mobile network managed by a communication common carrier.

(Supplementary Note 7)

A control system comprising:

a communication unit configured to communicate with a communication terminal;

a storage unit configured to manage and store an airframe ID of a flying body and a plurality of pieces of information regarding the flying body indicated by the airframe ID so as to be associated with each other; and a selection unit configured to select information to be transmitted to the communication terminal from among the plurality of pieces of information regarding the flying body, wherein in a case where the communication unit receives, from the communication terminal, an inquiry message containing the airframe ID and an authority level assigned to the communication terminal, the selection unit is further configured to refer to the storage unit to select, in accordance with the authority level of the communication terminal, the information to be transmitted to the communication terminal from among the plurality of pieces of information regarding the flying body associated with the airframe ID, and the communication unit is further configured to transmit the information selected by the selection unit to the communication terminal.

(Supplementary Note 8)

The control system according to Supplementary Note 7, further comprising:

an encryption unit configured to encrypt information on the flying body, the information being associated with a predetermined authority level.

(Supplementary Note 9)

A flying body identification method comprising:

managing an airframe ID of a flying body and a plurality of pieces of information regarding the flying body indicated by the airframe ID so as to be associated with each other;

selecting, in a case where an inquiry message containing the airframe ID and an authority level assigned to a communication terminal is received from the communication terminal, information to be transmitted to the communication terminal from among the plurality of pieces of information regarding the flying body associated with the airframe ID in accordance with the authority level of the communication terminal; and transmitting the selected information to the communication terminal.

(Supplementary Note 10)

A non-transitory computer readable medium in which a program is stored, the program causing a computer to execute processes to:

manage the airframe ID and a plurality of pieces of information regarding the flying body indicated by the airframe ID so as to be associated with each other;

select, in a case where an inquiry message containing the airframe ID and an authority level assigned to the communication terminal is received from the communication terminal, information to be transmitted to the communication terminal from among the plurality of pieces of information regarding the flying body associated with the airframe ID in accordance with the authority level of the communication terminal; and transmit the selected information to the communication terminal.

(Supplementary Note 11)

A flying body comprising:

a storage unit configured to store flying body information and an authority level so as to be associated with each other, the flying body information being information regarding a flying body;

an encryption unit configured to encrypt the flying body information associated with a predetermined authority level; and a communication unit configured to send the encrypted flying body information.

REFERENCE SIGNS LIST

1, 100, 101, 102, 103 FLYING BODY IDENTIFICATION SYSTEM
2, 20, 21 FLYING BODY
3, 30, 31, 32, 33 CONTROL SYSTEM
4 COMMUNICATION UNIT
5 IDENTIFICATION UNIT
6 GENERATION UNIT
7 STORAGE UNIT
8 ESTIMATION UNIT
9 SELECTION UNIT
10 ENCRYPTION UNIT
11 FLIGHT CONTROL UNIT
12 DRIVE MECHANISM
13 SENSOR
14 COMMUNICATION UNIT
15 AIRFRAME ID CONTROL UNIT
16 DISPLAY UNIT
17 BATTERY
18 STORAGE UNIT
19 ENCRYPTION UNIT
40 COMMUNICATION TERMINAL
201 NETWORK INTERFACE
202 PROCESSOR
203 MEMORY

The invention claimed is:

1. A flying body identification system comprising:

a flying body configured to transmit an airframe ID;

a communication terminal configured to obtain the airframe ID from the flying body and to be operated by a first user, wherein the first user is not located in the flying body, wherein the first user is different from a second user in the flying body; and a control system configured to communicate with the communication terminal and control an operation of the flying body, wherein the control system is further configured to:

manage the airframe ID and a plurality of types of information regarding the flying body indicated by the airframe ID so as to be associated with each other, wherein a type of the plurality of types of information regarding the flying body is a flight plan, and a second type of the plurality of types of information is a position;

select, in a case where an inquiry message containing the airframe ID and an authority level assigned to the communication terminal is received from the communication terminal, information to be transmitted to the communication terminal from among the plurality of types of information regarding the flying body associated with the airframe ID in accordance with the authority level of the communication terminal;

transmit the selected information to the communication terminal;

determine, based on the flight plan and the position, that the flying body has deviated from a path of the flight plan; and control a drive mechanism of the flying body such that the flying body approaches the path of the flight plan.

2. The flying body identification system according to claim 1, wherein the control system is further configured to:

manage the plurality of types of information regarding the flying body and a plurality of authority levels so as to be associated with each other; and select information regarding the flying body associated with the authority level assigned to the communication terminal, or select information regarding the flying body associated with the authority level assigned to the communication terminal and an authority level lower than the authority level.

3. The flying body identification system according to claim 1, wherein the control system is further configured to encrypt information on the flying body, the information being associated with a predetermined authority level.

4. The flying body identification system according to claim 1, wherein in case of emergency, the flying body is configured to directly transmit emergency information to the communication terminal without passing through the control system, the emergency information containing failure and a landing place.

5. The flying body identification system according to claim 4, wherein the flying body is further configured to broadcast the emergency information to a communication terminal on earth, the communication terminal existing at the landing place and on a landing path.

6. The flying body identification system according to claim 5, wherein the flying body is further configured to broadcast the emergency information to the communication terminal on earth via a mobile network managed by a communication common carrier.

7. A flying body identification method for a control system, the flying body identification method comprising:

managing an airframe ID obtained from a flying body by a communication terminal, and a plurality of types of information regarding the flying body indicated by the airframe ID so as to be associated with each other, wherein a type of the plurality of types of information regarding the flying body is a flight plan, and a second type of the plurality of types information is a position;

selecting, in a case where an inquiry message containing the airframe ID and an authority level assigned to a communication terminal is received from the communication terminal, information to be transmitted to the communication terminal from among the plurality of types of information regarding the flying body associated with the airframe ID in accordance with the authority level of the communication terminal;

transmitting the selected information to the communication terminal;

determining, based on the flight plan and the position, that the flying body has deviated from a path of the flight plan; and controlling a drive mechanism of the flying body such that the flying body approaches the path of the flight plan; wherein the control system is capable of communicating with the communication terminal and configured to control an operation of the flying body, the flying body is capable of transmitting the airframe ID, the communication terminal is configured to be operated by a first user, and wherein the first user is not located in the flying body and is different from a second user in the flying body.

8. The flying body identification method according to claim 7, further comprising:

managing the plurality of types of information regarding the flying body and a plurality of authority levels so as to be associated with each other; and selecting information regarding the flying body associated with the authority level assigned to the communication terminal, or selecting information regarding the flying body associated with the authority level assigned to the communication terminal and an authority level lower than the authority level.

9. The flying body identification method according to claim 7, further comprising:

encrypting information on the flying body, the information being associated with a predetermined authority level.

10. The flying body identification method according to claim 7, wherein in case of emergency, the flying body is configured to directly transmit emergency information to the communication terminal without passing through the control system, the emergency information containing failure and a landing place.

11. The flying body identification method according to claim 10, wherein the flying body is further configured to broadcast the emergency information to a communication terminal on earth, the communication terminal existing at the landing place and on a landing path.

12. The flying body identification method according to claim 11, the flying body is further configured to broadcast the emergency information to the communication terminal on earth via a mobile network managed by a communication common carrier.

13. A non-transitory computer readable medium in which a program for causing a computer to perform a flying body identification process in a control system is stored, the program causing the computer to execute processes to:

manage an airframe ID of a flying body and a plurality of types of information regarding the flying body indicated by the airframe ID so as to be associated with each other, wherein a type of the plurality of types information regarding the flying body is a flight plan, and a second type of the plurality of types of information is a position;

select, in a case where an inquiry message containing the airframe ID and an authority level assigned to a communication terminal is received from the communication terminal, information to be transmitted to the communication terminal from among the plurality of types of information regarding the flying body associated with the airframe ID in accordance with the authority level of the communication terminal;

transmit the selected information to the communication terminal;

determine, based on the flight plan and the position, that the flying body has deviated from a path of the flight plan; and control a drive mechanism of the flying body such that the flying body approaches the path of the flight plan; wherein the control system is capable of communicating with the communication terminal and configured to control an operation of the flying body, the flying body is capable of transmitting the airframe ID, the communication terminal is configured to be operated by a first user, and wherein the first user is not located in the flying body and is different from a second user in the flying body.

14. The non-transitory computer readable medium according to claim 13, wherein the program causes the computer to further execute processes to:

manage the plurality of types of information regarding the flying body and a plurality of authority levels so as to be associated with each other; and select information regarding the flying body associated with the authority level assigned to the communication terminal, or select information regarding the flying body associated with the authority level assigned to the communication terminal and an authority level lower than the authority level.

15. The non-transitory computer readable medium according to claim 13, wherein the program causes the computer to further execute processes to:

encrypt information on the flying body, the information being associated with a predetermined authority level.

16. The non-transitory computer readable medium according to claim 13, wherein in case of emergency, the flying body is configured to directly transmit emergency information to the communication terminal without passing through the control system, the emergency information containing failure and a landing place.

17. The non-transitory computer readable medium according to claim 13, wherein the flying body is further configured to broadcast the emergency information to a communication terminal on earth, the communication terminal existing at the landing place and on a landing path.

* * * * *